(12) United States Patent
Klein et al.

(10) Patent No.: US 6,738,790 B1
(45) Date of Patent: May 18, 2004

(54) APPROACH FOR ACCESSING LARGE OBJECTS

(75) Inventors: Jonathan Klein, Redwood City, CA (US); Bhaskar Himatsingka, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 629 days.

(21) Appl. No.: 09/810,120

(22) Filed: Mar. 15, 2001

Related U.S. Application Data

(62) Division of application No. 09/405,410, filed on Sep. 24, 1999, now Pat. No. 6,243,718, which is a continuation of application No. 08/962,132, filed on Oct. 31, 1997, now Pat. No. 6,061,678.

(51) Int. Cl.$^7$ .............................................. G06F 17/30
(52) U.S. Cl. ...................................................... 707/203
(58) Field of Search ................................ 707/100, 102, 707/104.1, 203

(56) References Cited

U.S. PATENT DOCUMENTS

| | | | |
|---|---|---|---|
| 5,109,487 A | 4/1992 | Ohgomori et al. | 395/200 |
| 5,347,653 A | 9/1994 | Flynn et al. | 707/203 |
| 5,566,329 A | 10/1996 | Gainer et al. | 707/104 |
| 5,678,046 A | 10/1997 | Cahill et al. | 707/200 |
| 5,732,402 A | 3/1998 | Lehman | 707/205 |
| 5,742,810 A | 4/1998 | Ng et al. | 707/4 |
| 5,857,203 A | 1/1999 | Kauffman et al. | 707/200 |
| 5,864,849 A | 1/1999 | Bohannon et al. | 707/8 |
| 5,905,506 A | 5/1999 | Hamburg | 345/438 |
| 5,983,229 A | 11/1999 | Houchin et al. | 707/100 |
| 5,999,943 A * | 12/1999 | Nori et al. | 707/104.1 |
| 6,061,678 A | 5/2000 | Klein et al. | 707/3 |
| 6,125,371 A | 9/2000 | Bohannon et al. | 707/203 |
| 6,209,000 B1 * | 3/2001 | Klein et al. | 707/203 |
| 6,243,718 B1 * | 6/2001 | Klein et al. | 707/203 |
| 2003/0088593 A1 * | 5/2003 | Stickler | 707/205 |
| 2003/0097365 A1 * | 5/2003 | Stickler | 707/100 |
| 2003/0193994 A1 * | 10/2003 | Stickler | 375/150 |

OTHER PUBLICATIONS

Lehman, et al., DB2 LOBs: "The Teenage Years," IEEE Computer Society Press, pp. 192–199, 1996.

Biliris, "An Efficient Database Storage Structure for Large Dynamic Objects,"Proceedings of the 1992 International Conference on Data Engineering, USA, IEEE Computer Society Press, pp. 301–308.

Campbell, et al., "The Role of Database Systems in the Management of Multimedia Information," Multi–media Database Management Systems, 1995. Proceedings., International Workshop, pp. 4–11.

* cited by examiner

*Primary Examiner*—Safet Metjahic
*Assistant Examiner*—Haythim J. Alaubaidi
(74) *Attorney, Agent, or Firm*—Hickman Palermo Truong & Becker LLP; Edward A. Becker

(57) ABSTRACT

A method and system for accessing a large object (LOB) that belongs to a cell in a table are provided. An index is built on a column in which the cell resides. The index has a key that includes a LOB identifier. A database server receives from a client a request to access the LOB. The server uses a LOB identifier value for the LOB to traverse the index to locate an index entry for the LOB. The server then follows address information contained in the index entry to a storage containing at least a portion of the LOB and accesses the portion of the LOB as specified in the request. A method and system for tracking storage for data items are also disclosed. Within an index that is built to access the data items are stored both index entries for locating blocks that store current versions of the data items, and index entries for locating blocks that store non-current versions of the data items.

18 Claims, 6 Drawing Sheets

APPROACH FOR ACCESSING LARGE OBJECTS

RELATED APPLICATIONS

This application is a Divisional of U.S. patent application Ser. No. 09/405,410, filed Sep. 24, 1999, entitled "BUILDING INDEXES ON COLUMNS CONTAINING LARGE OBJECTS" which is now U.S. Pat. No. 6,243,718 which is a continuation of U.S. patent application Ser. No. 08/962,132, filed on Oct. 31, 1997 now U.S. Pat. No. 6,061,678, entitled "APPROACH FOR MANAGING ACCESS TO LARGE OBJECTS IN DATABASE SYSTEMS USING LARGE OBJECT INDEXES," the content of which are hereby incorporated by reference in their entirety.

This application is related to U.S. patent application Ser. No. 08/962,487, entitled "LOB LOCATORS," filed Oct. 31, 1997, by Anil Nori and Susan Kotsovolos, and this application is related to U.S. patent application Ser. No. 09/405,460, entitled "TRACKING MULTIPLE VERSIONS OF DATA ITEMS BY UTILIZING A SINGLE INDEX," filed Sep. 24, 1999, by Jonathan Klein and Bhaskar Himatsingka, the contents of which are incorporated herein by reference in their entirety for all purposes.

FIELD OF THE INVENTION

The present invention relates to database systems, and more specifically, to techniques for handling large objects (LOBs) within a client server database system.

BACKGROUND OF THE INVENTION

Recently a trend has developed to expand database systems to handle non-traditional data types (e.g. images, text, and audio data). In particular, it has become important to provide database systems that handle user-defined "large objects" (LOBs). LOBs may be much larger than traditional data types. For example, a single LOB may include four gigabytes of data.

Because of their size, LOBs cannot be efficiently handled with the same techniques used to handle traditional data types. For example, conventional database systems consist of one or more clients ("database applications") and a server (a "database server"). When a client requires data, the client submits a query to the server that selects the data. The server retrieves the selected data from a database and returns copies of the selected data to the client that submitted the query. When the selected data items are LOBs, the amount of data that would be returned to the user could be enormous. Consequently, automatically sending an entire LOB would be inefficient and time consuming, particularly when the client is only interested in viewing or updating a relatively small subset of the entire LOB.

The size of LOBs also results in space management difficulties within the database system. In typical database systems, it is important to be able to supply data items as they existed at a particular point in time. To do this, database systems typically either store data that allows data items to be reconstructed as they existed as of a given time, or store multiple versions of data items. In either case, the amount of data that would have to be stored to support LOBs could be enormous. The storage usage problems thus created can be mitigated by reclaiming space that is no longer required by LOBs. Consequently, it is clearly desirable to provide a mechanism for efficiently maintaining information about storage that can be re-used after the LOB data contained thereon is no longer needed.

LOB data may also be thought of as a file or a stream of characters or bytes. Applications are used to storing and accessing large amounts of data in a file, and the same is expected from LOBs. As in file access, applications require random, sequential piecewise access to LOB data. Also, file operations seldom copy the whole file, and the same behavior is expected of LOB operations.

One approach to handling LOBs may be to deliver to a client only a subset of the LOB. However, conventional retrieval mechanisms are designed to provide fast access to entire sets data items, such as rows, and not sub portions of individual data items. Thus, even after a LOB is located, the time it would take to scan through the LOB to retrieve a particular subset of interest may be unacceptably long.

Another difficulty presented by the size of LOBs relates to how users are provided consistent views of a database that includes LOBs. Specifically, some database systems provide consistent views of the database to users by generating undo records when data items are updated. When applied to an updated item, the undo record reconstructs the data item as it existed before the update. Consequently, a user can be shown the database as of a particular point in time by applying one or more undo records to data items requested by a user that have been updated since that point in time.

Unfortunately, as a general rule, the larger the updated data item, the larger the undo record that must be generated in order to undo the update. Consequently, generating undo records for LOBs is inefficient and impractical due to the amount of data that would have to be generated and stored in response to every update.

Based on the foregoing, it is clearly desirable to provide a mechanism to efficiently access LOBs and desired portions within LOBs. It is further desirable to provide a mechanism for reconstructing a consistent view of a database that includes LOBs.

SUMMARY OF THE INVENTION

According to one aspect of the invention, a method is provided for accessing data that belongs to a particular snapshot. According to the method, an index is used to locate an index entry associated with the data. One or more undo records are applied to the index entry to reconstruct a non-current version of the index entry. Location information is read from the non-current version of the index entry. Finally, a non-current version of the data stored at a location identified by the location information is accessed, wherein both the non-current version of the index entry and the non-current version of the data belong to the particular snapshot.

According to another aspect of the invention, a method is provided for accessing large objects (LOBs) that belong to a column of a table. According to the method, an index is built on the column, the index including index entries that contain pointers to blocks containing LOB data associated with the LOBs. If a first parameter is set to a first value, then a locator is stored for each LOB in the table, wherein each locator includes a LOB identifier and a version number for a corresponding LOB, and LOB data is stored for each LOB out of the table. If the first parameter is set to a second value, then a locator is stored for each LOB in the table. Finally, LOB data is stored in the table for at least a subset of the LOBs that belong to the column.

According to another aspect of the invention, a method is provided for accessing large objects (LOBs) that belong to a column of a table. The method includes building an index on the column, wherein the index includes index entries that contain pointers to blocks containing LOB data associated with the LOBs. Then, a locator is stored for each LOB in the table, wherein each locator includes a LOB identifier and a version number for a corresponding LOB. Finally, a plurality of pointers is stored within at least one cell in the column, where each pointer of the plurality of pointers points to a LOB chunk of a LOB that belongs to the cell.

BRIEF DESCRIPTION OF THE DRAWINGS

The present invention is illustrated by way of example, and not by way of imitation, in the figures of the accompanying drawings and in which like reference numerals refer to similar elements and in which.

DETAILED DESCRIPTION OF THE PREFERRED EMBODIMENT

A method and apparatus for manipulating LOBs in a database system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, the various features of the invention shall be discussed under topic headings that appear in the following order:

I. HARDWARE OVERVIEW
II. FUNCTIONAL OVERVIEW
III. TYPES OF LOBS
IV. TYPES OF LOCATORS
V. THE LOCATOR STRUCTURE
  A. ON-DISK LOCATORS FOR INTERNAL LOBS
  B. IN-MEMORY LOCATORS FOR INTERNAL LOBS
  C. LOCATORS FOR EXTERNAL LOBS
VI. USING INTERNAL LOB LOCATORS FOR CONSISTENT ACCESS
VII. STORAGE OF LOCATORS
VIII. LOB COLUMNS
IX. IN-TABLE AND OUT-OF-TABLE STORAGE OF LOBS
X. DIVIDING LOBS INTO DIRECTLY ACCESSIBLE CHUNKS
XI. USING A LOCATOR TO ACCESS A LOB CHUNK
XII. OBTAINING LOCATORS FROM ALREADY-EXISTING ROWS
XIII. LOB API ROUTINES
XIV. USING LOCATORS WITH VIEWS
XV. STATELESS SERVER-SIDE USE OF LOCATORS
XVI. LOCATOR ENCRYPTION
XVII. USING LOB LOCATORS TO ACCESS EXTERNAL LOBS
XVIII. LOB COLUMN INDEXES
XIX. INDEX ENTRY FORMAT OF LOB COLUMN INDEXES
XX. USING VERSIONING TO PROVIDE CONSISTENT VIEWS OF INTERNAL LOBS
XXI. USING UNDO INFORMATION TO PROVIDE CONSISTENT VIEWS OF LOB INDEXES
XXII. RECOVERING REUSABLE BLOCKS THAT HELD LOB DATA
XXIII. USING INDEX ENTRIES TO INDICATE REUSABLE BLOCKS
XXIV. SEGREGATING REUSABLE LIST GROUPS WITHIN AN INDEX
XXV. LEAST RECENTLY USED REUSABLE-LISTS
XXVI. MULTIPLE REUSABLE-LISTS WITHIN A SINGLE INDEX
XXVII. REPRESENTING HOLES WITHIN AN INDEX
XXVIII. STORING CONTROL INFORMATION IN INDEX ENTRIES
XXIX. IN-TABLE STORAGE OF INDEX INFORMATION
XXX. SELECTABLE LOB CACHING

I. HARDWARE OVERVIEW

Figure 1:
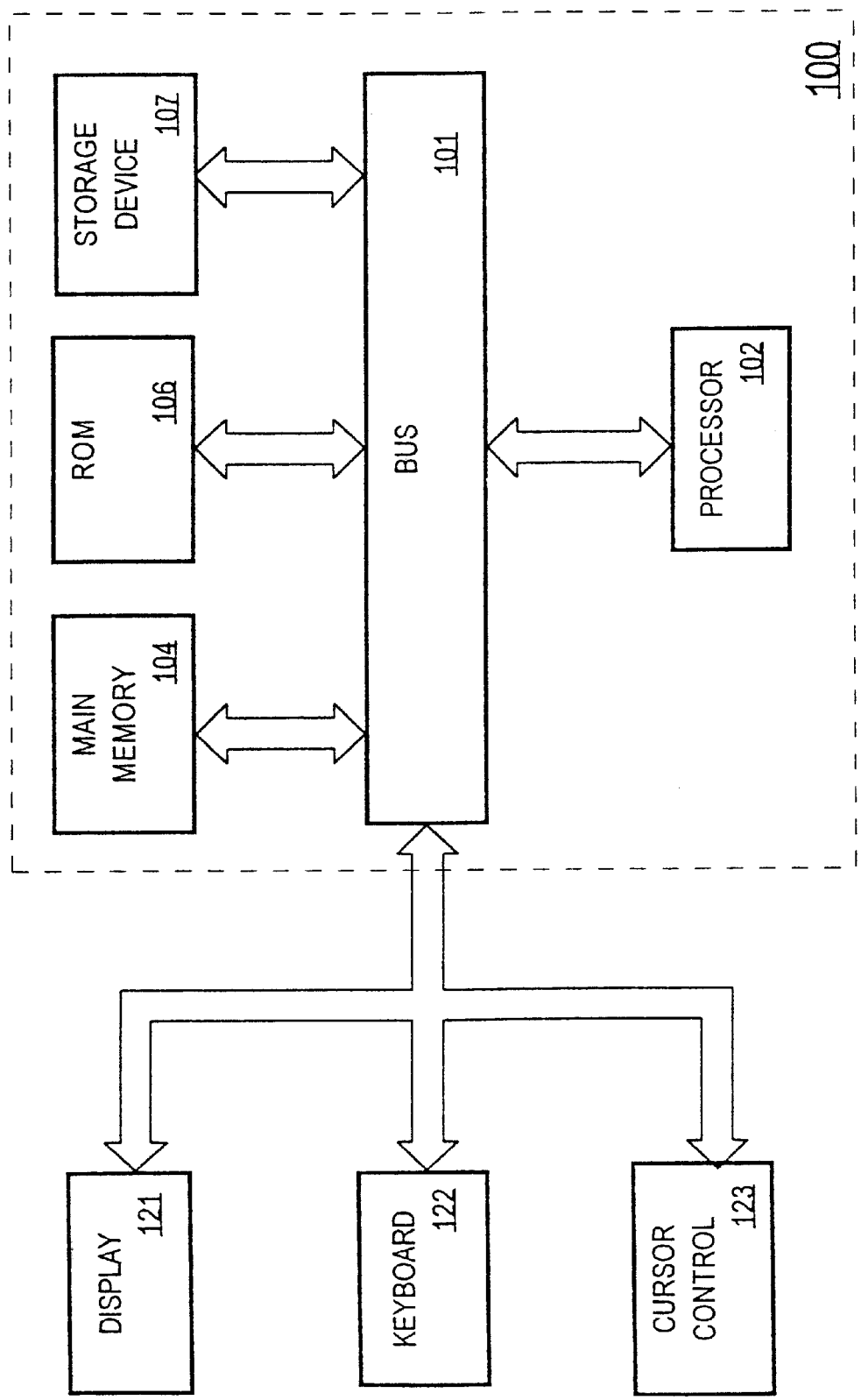
FIG. 1 is a block diagram of a computer system on which embodiment of the present invention may be implemented.

Referring to FIG. 1, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. Computer system 100 further includes a keyboard 122 and a cursor control 123, such as a mouse.

The present invention is related to the use of computer system 100 to store and manipulate LOBs within a database system. According to one embodiment, LOB storage and manipulation is performed by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

II. FUNCTIONAL OVERVIEW

According to one aspect of the invention, a database server operates similar to a file system in that the database server does not send an entire LOB to a client when the client requests a LOB. Instead, the server constructs and sends to the client a special data structure, referred to herein as a LOB locator, that acts as a "handle" through which access to the LOB is performed. Each LOB locator stores information about a corresponding LOB. Passing the locator of a LOB to the client is effectively the same as passing a copy of the LOB to the client, though the actual LOB is not passed.

Once the client has received the LOB locator for a LOB, the client may perform operations on the LOB by making calls to an Application Programming Interface (API) provided by the server. The routines in the API require as one input parameter the locator of the LOB on which an operation is to be performed. Thus, the locator associated with a LOB is passed back and forth between the database server and clients that operate on the LOB. Passing the locator in this manner reduces the amount of data that must be sent to the clients, allows the clients to operate on specified subsets of the LOB, and reduces the amount of state information that must be maintained by the database server.

Specifically, before a client can operate on data within a LOB, the client requests the LOB locator associated with the LOB. The database server responds to the request by passing the appropriate LOB locator to the client. The client then may issue one or more requests to operate on randomly selected portions of the LOB. With each of the requests, the client passes back to the server the locator for the LOB. Based on the information contained in the LOB locator, the database server determines whether the requested action is authorized, and if so, determines the appropriate version of the LOB and performs the specified operation to the specified portion of the LOB.

According to one embodiment of the invention, an index is built on the LOB column. Changes made to the LOB index may be rolled back using undo records to access old versions of LOB data. Reusable block bits may be stored within the index to increase the efficiency with which the storage containing the LOB data is managed.

III. TYPES OF LOBS

According to one embodiment of the invention, LOBs may be either internal or external. Internal LOBs are stored in the database. Internal LOBs use copy semantics and participate in the transactional model of the server. That is, clients are effectively (but not actually) supplied their own separate copies of internal LOBs. In addition, all the properties that pertain to other database objects also pertain to internal LOBs. For example, any changes made to an internal LOB value during a transaction can be committed or rolled back along with the changes made to all other data items during that transaction.

External LOBs are large binary data objects stored in operating system files outside of the database. External LOBs are stored in operating system files on the server side. External LOBs use reference semantics similar to shared files in a file system. That is, all clients effectively perform operations on a single copy of an external LOB, as opposed to being supplied their own separate copies. External LOBs may be located on any type of storage device, such as hard disks, CDROMs, and PhotoCDs, but a single LOB may not extend from one device to another. Unlike internal LOBs, external LOBs do not participate in the transactions model. Thus, any support for integrity and durability of external LOBs is provided by the underlying file system as governed by the operating system.

According to an embodiment of the invention, a database server is provided which supports the same or substantially the same Application Programming Interface (API) for both internal and external LOBs. Consequently, from the client's perspective, whether a particular LOB is stored inside or outside the database is largely transparent. However, as shall be described in greater detail hereafter, the database server maintains different sets of data within the locators associated with LOBs depending on whether the LOBs are internal or external.

IV. TYPES OF LOCATORS

According to an embodiment of the invention, various types of locators are used within the database system. The type of a locator hinges on various factors, including whether the locator is for an internal LOB or an external LOB. In addition, the contents of locators differ based on whether the locators are stored within the database ("on disk") or whether they have been generated within dynamic memory in response to a particular client request.

In general, locators stored on-disk within the database contain only the information about the corresponding LOB that does not change from access to access. Locators generated in dynamic memory ("in-memory locators") additionally include information about the specific accesses that triggered the generation of the in-memory locators.

Preferably, all types of locators are stored as arrays of single-byte values. By storing locators as arrays of single-byte values, the locators can be sent back and forth between the clients and the server without the need to perform data transformations in response to differences in the client and server platforms.

V. THE LOCATOR STRUCTURE

A. ON-DISK LOCATORS FOR INTERNAL LOBS

According to one embodiment of the invention, the on-disk locator for an internal LOB contains the following fields: length, version, flag, byte-width, and LOB identifier ("lobid").

The "length" field indicates the length of the locator. According to one embodiment, the length field for the on-disk locators associated with internal LOBs will have the same value, since all of the values stored on-disk for internal LOBs have a fixed length. However, the length value for internal LOB locators will differ from the length values used by external LOB locators because a different set of information is maintained within the locators for the two types of LOBs.

The "version" value indicates the version of the locator type. The version value is incremented when the locator structure is changed.

The "flag" field stores data to indicate various attributes of the corresponding LOB. Such attributes include, for example, the type of the LOB (i.e. BLOB, CLOB, NCLOB, BFILE), an initialized flag (indicating whether the locator is initialized and valid), an empty flag (indicating that an empty LOB should be created), and attributes that indicate whether the LOB value is stored in the row or out of the row.

The "byte-width" field indicates the width of the character of the data stored in the corresponding LOB. For example, the byte-width may indicate that the data stored within the LOB is from a type-byte national character set. For LOBs that store binary and single character information the byte-width is one byte.

The "lobid" field of a locator contains a value that uniquely identifies the LOB associated with the locator. As shall be explained in greater detail below, the lobid is used as the key for indexes built on columns that contain LOBs.

B. IN-MEMORY LOCATORS FOR INTERNAL LOBS

When a client requests the locator for a LOB, the database server constructs a in-memory locator and returns the in-memory locator to the client. The in-memory locator for a LOB contains all of the fields of the on-disk locator for the LOB, plus additional information. According to an embodiment of the invention, the in-memory locator for an internal LOB includes the following fields:

"object-number": The object-number field contains a value that may be used to locate the appropriate row of a table that contains LOB metadata (the "LOB metadata table"). The LOB metadata table contains, for example, metadata regarding the size of LOB chunks into which a LOB is divided.

"table-id": The table-id field contains a value that identifies the table from which the LOB was retrieved.

"ecol": The ecol field contains an identifier for the external column to which the LOB belongs.

"icol": The icol field contains an identifier for the internal column to which the LOB belongs. Internal columns differ from external columns in that what is presented to the user as data from a single "external" column may actually be stored by the database in multiple "internal" columns.

"cid": the cid field identifies the character set associated with a LOB that stores character data.

"v_objn": The v_objn field contains a value that identifies the view from which the LOB was retrieved.

"v_icol": The v_icol field stores a value to indicate the column of a view to which the LOB belongs.

"v_hash": The v_hash field is a hash value used to ensure that the LOB locators sent back to the server from clients have not been tampered with by the clients.

"snapshot-id": The snapshot-id field contains a value that indicates the consistent read version of the LOB that is associated with the LOB locator.

"rowid": The rowid field contains the value of the row in which the LOB belongs.

When a client accesses a LOB directly from a table rather than through a view, the fields that contain view-related information, such as v_objn, v_icol, v_hash are not used. When a LOB resides in a index-only table, then the primary key of the index entry to which the LOB belongs is placed in the in-memory locator.

C. LOCATORS FOR EXTERNAL LOBS

According to an embodiment of the invention, both on-disk and in-memory locators for external LOBs include the following fields: length, version, flag, byte-width, fileid, dirl, dir, fill, filename.

The "length" field indicates the length of the locator. This allows for locators to have different sizes.

The "version", "flag" and "byte-width" fields store the same information as the corresponding fields in internal LOB locators.

The "fileid" field stores an unique identifier supplied by the operating system when the file is opened.

The "dirl" field stores the length of the directory alias.

The "dir" field stores an alias that has been established for the full path to where the LOB resides.

The "fill" field stores the length of the filename for the external LOB.

The "filename" field stores the operating system filename for the external LOB.

VI. USING INTERNAL LOB LOCATORS FOR CONSISTENT ACCESS

To ensure that a particular client sees a consistent view of the database, the server sends to the client data from a particular "snapshot" of the database. A snapshot is like a timestamp. A snapshot of the database reflects all changes committed to the database as of a particular point in time, and no changes committed after that point in time. When a client reads LOB data, changes that have been made to the LOB data must be removed from the LOB data before the LOB data is supplied to the client if the changes were made after the snapshot time being used by the client.

For the purposes of consistency, the server applies the same rules to internal LOBs as are applied to other types of data items. Specifically, when reading LOB data, the server supplies to a client the version of an internal LOB that corresponds to the snapshot being used by the client. To ensure that only the appropriate version of a LOB is sent to a client, the server stores in the snapshot-id field of each in-memory locator a value that indicates the snapshot being used by the client that requested the LOB locator.

When the client requests operations on the LOB, the client passes back the locator with the requests. The server reads the snapshot-id value from the locator and determines which version of the requested LOB data to supply to the client. The server then supplies the appropriate version of the specified portion of the LOB to the client. The server may supply to the client an out-of-date version of a portion of a LOB, for example, if the requested portion of the LOB has been updated by another client subsequent to the snapshot time indicated in the locator that accompanies the request.

By supplying to a client LOB data as it existed as of the time represented in a locator's snapshot-id, the client is, in effect, allowed to operate on a separate copy of the LOB that was made at the snapshot time, even though no such copy was actually made.

To allow a client to see changes that it has made to a LOB, the snapshot-id within the locator used by the client must be updated when the client updates the LOB. For example, assume that a client submits a request to update a portion of a LOB1. With the request, the client passes to the server the locator for LOB1. Assume that the snapshot time specified in the locator is time T1. If no other client has locked LOB1, then the server will lock and update LOB1 as requested. Assuming that the time that the server performed the update was time T2, the server then sets the snapshot-id time in the locator to time T2 and passes the locator back to the client. For subsequent operations on LOB1, the client uses the revised locator. For example, if the client subsequently attempts to read the portion of LOB1 that it previously updated, the server will supply to the client the version of the portion of LOB1 that existed at time T2, which will include the update made by the client at time T2.

When a client modifies a LOB value, the most current version of the LOB value is modified regardless of the snapshot-id time within the locator used by the client to perform the modification. Before performing any modifications, the client locks the row containing the LOB value to be updated to prevent other clients from performing subsequent updates to the LOB value before the client commits its modifications.

However, only the copy of the locator used to perform an update is updated with the new snapshot-id. Thus, if a copy of the locator is made prior to the update (at T2), after performing the update the user may use the copy of the locator that was not used to perform the update to access the LOB as of time T1.

VII. STORAGE OF LOCATORS

According to one embodiment of the invention, locators are stored in the column/row intersection ("cell") of a table to which the LOB that corresponds to the locator belongs. By storing locators within tables rather than external to the tables, existing transaction support routines may be used on the locators. In addition, the security rules used to govern access to data within the table are also used to govern access to the locators of the LOBs that belong to the table. Thus, a user that does not have rights to update a different column in a particular table will be prevented from updating the locator for that LOB as well.

To ensure that the security of the table is preserved, data within the locator is used to indicate the column and table or view to which the corresponding LOB belongs. When a client passes the database server a locator in a request to perform an operation on the corresponding LOB, the database server reads the column and table/view information from the locator, inspects the metadata associated with the identified column, and table/view, and determines based on the metadata and the identity of the requesting client whether the requesting client is authorized to perform the requested operation.

VIII. LOB COLUMNS

A column for storing LOBs is referred to herein as a LOB column. As shall be described in greater detail below, the actual data of the LOBs that belong to a LOB column is not necessarily co-located with the data of the non-LOB columns of a table (the "primary store"). Rather, the data of large internal LOBs may be stored elsewhere in the database, while data for all external LOBs are stored outside the database but on the same machine as the database. According to an embodiment of the invention, the locators for the LOBs that belong to a column are stored in the primary store regardless of whether the actual LOB data is also stored in the primary store.

The API provided by the database server through which clients specify operations on LOBs allows clients to randomly access data within LOBs. For example, a client may request the portion of a LOB1 that begins at byte 1000 and is 5000 bytes long. Without the locator information and an index, the simplest way to perform such an access would be to scan down the table to locate the row of the LOB column that contains the appropriate lobid, follow a pointer from the appropriate row to the beginning of LOB1, scan to byte 1000, and then read the next 5000 bytes.

To reduce the time it takes to access a particular LOB, an index may be built on the LOB column. Traditional indexes include one index entry per value in the column. For LOB columns, an index may include one entry in the form <lobid, addr> for each LOB that belongs to the column, where "lobid" uniquely identifies the LOB associated with the entry and "addr" is the starting address for the data contained in the LOB. By using an index, the table scan could be avoided by simply traversing the index to locate the index entry with the appropriate lobid, and then following the "addr" pointer in that index entry to the beginning of the data for LOB1.

Unfortunately, even if a traditional index is used to find the start of a LOB, the act of scanning from the beginning of the LOB data to the specified starting position within the LOB is inefficient and time consuming. For example, it would be very inefficient to scan through 4 gigabytes of data just to let a client read the last few bytes of a 4 gigabyte LOB. Therefore, as shall be explained in greater detail below, special indexes are built on LOB columns to provide more efficient multiple point access into LOBs.

IX. IN-TABLE AND OUT-OF-TABLE STORAGE OF LOBS

Figure 2:
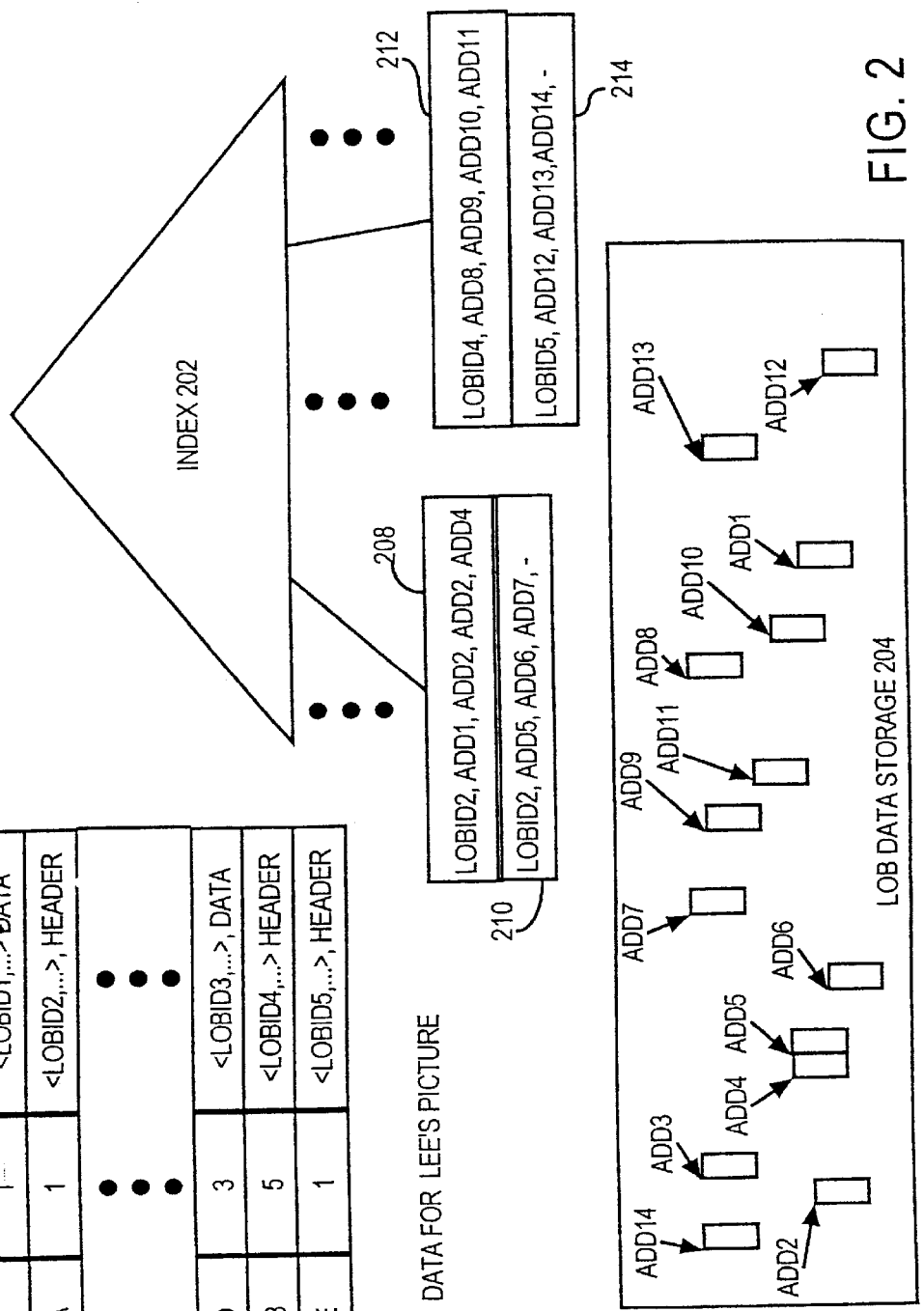
FIG. 2 is a block diagram of a table containing a LOB column with a corresponding index and storage area according to one embodiment of the invention.

Referring to FIG. 2, it is a block diagram that illustrates a table 200 with a LOB column 206, a separate LOB data storage 204, and a special index 202 built on the LOB column 206, according to an embodiment of the invention.

In the illustrated embodiment, table 200 stores data associated with employees, and the LOB column 206 of table 200 stores pictures of the employees. The size of the picture data varies from employee to employee. For the purpose of explanation, it shall be assumed that the sizes of JOE and TED's pictures are less than 4000 bytes, that TINA's picture is 28 Kilobytes, that BOB's picture is 16 Kilobytes and that LEE's picture is 12 Kilobytes.

According to one embodiment, LOBs that fall below a certain size threshold are stored within the LOB column itself, while LOBs that exceed the size threshold are stored in the separate LOB data storage 204. If a LOB that is currently stored inside LOB column 206 is updated such that its new size exceeds the size threshold, then the LOB is migrated to the separate LOB data storage 204. Conversely, if a LOB currently stored in LOB data storage 204 is updated in a manner that reduces the size of the LOB below the size threshold, then the LOB is migrated into the LOB column 206.

The illustrated example uses a 4000 byte threshold. Consequently, JOE's picture and TED's picture are stored within the LOB column 206, while TINA's picture, BOB's picture, and LEE's picture are stored in LOB data storage 204.

X. DIVIDING LOBS INTO DIRECTLY ACCESSIBLE CHUNKS

According to one aspect of the invention, a "chunk size" is specified for a LOB column at the time the LOB column is defined. The chunk size indicates the size of directly accessible portions ("LOB chunks") of the LOB data. For example, assume that the chunk size specified for the LOB column 206 is 4K. TINA's picture is 28 Kilobytes. Therefore, TINA's picture is composed of seven directly accessible 4 K LOB chunks.

Within LOB data storage 204, the data for a given picture is stored in one or more "chunk blocks" that have a size equal to the specified chunk size. While the disk blocks within each chunk block are contiguous, the chunk blocks that store data for any given LOB do not have to be contiguous with respect to each other. For example, the chunk size for LOBs stored in LOB data storage 204 is 4K. If each disk block is 1K, then each chunk block consists of four contiguous disk blocks. A 28 K LOB consists of seven LOB chunks stored in seven chunk blocks which may or may not be contiguous with respect to each other.

While the chunk blocks allocated to a given LOB need not be contiguous, according to one embodiment of the invention the space management process tries to ensure that they are initially contiguous. By using contiguous chunk blocks for a LOB, read-ahead operations become significantly more efficient.

According to one embodiment of the invention, each block of each chunk block contains the following control information: the lobid of the LOB that last populated the block and the version number of the LOB when the block was populated.

The version number of a LOB is incremented every time the LOB is written. Therefore, for any given LOB, blocks that contain lower version numbers reflect changes that were made before blocks that contain higher version numbers. This version information may be used to determine whether data from a particular block may be supplied to a client. For example, assume that a client requests a particular LOB chunk of version ten of a particular LOB. After locating the chunk block that contains the most recent version of that particular LOB chunk, the server compares the version information in the block with the LOB version specified by the client. If the version identified in the block is less than or equal to the version specified by the client, then the data within the block may be supplied to the client. If the version identified in the block is greater than the version specified by the client, then the data in the block cannot be supplied to the client because it reflects changes that were made after version ten of the LOB.

XI. USING A LOCATOR TO ACCESS A LOB CHUNK

Figure 3:
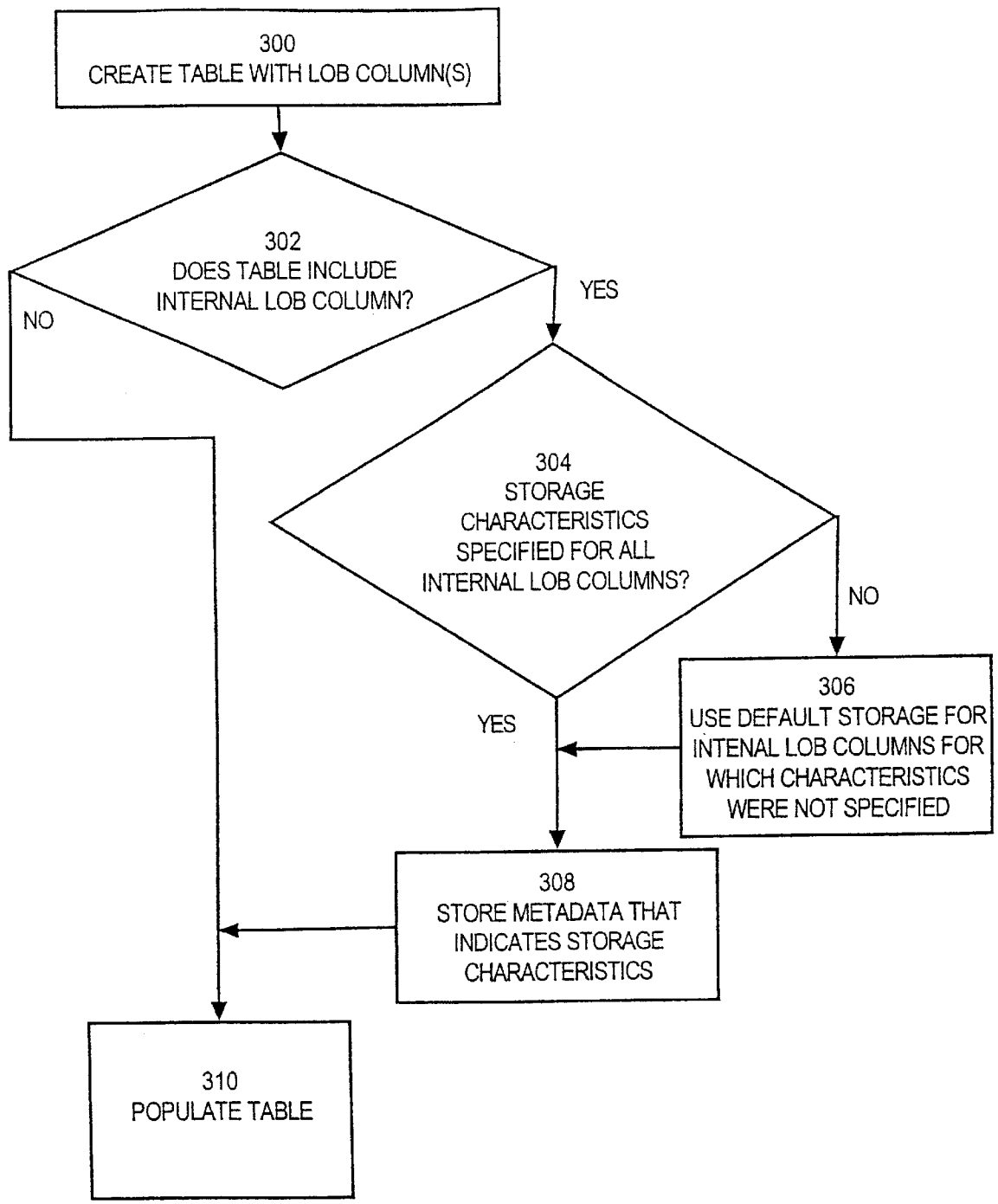
FIG. 3 is a flow chart illustrating steps for creating a table that contains a LOB column according to one embodiment of the invention.

Referring to FIG. 3, it is a flow chart illustrating the steps for using a locator to read a LOB according to an embodiment of the invention.

In step 300, a table containing one or more LOB columns is created. For the purpose of explanation, it shall be assumed that a client issues the following command to create a table "emp" that contains LOB columns:

```
CREATE TABLE emp
    (empid number,
    picture blob,
    resume clob,
    a_file bfile)
```

In this example, a table "emp" with three LOB columns is created. The first column "empid", which is not a LOB, stores an employee identification number. The second column stores employee pictures. In the illustrated example, the picture column is defined as a "blob", meaning an internal LOB that contains binary data. The third column "resume" stores employee resumes. The resume column is defined as a "clob", meaning an internal LOB that contains single-byte character data. The fourth column "a_file" is defined as a "bfile", indicating that the column contains external LOBs. According to one embodiment of the invention, the server also supports a type "nclob", which is an internal LOB that contains multi-byte fixed-width character data.

At step 302 it is determined whether the table contained a LOB column for internal LOBs. If the table contained a LOB column for internal LOBs, control proceeds to step 304. Otherwise, control proceeds to step 310. In the present example, the emp table includes columns for both internal and external LOBs. Therefore, control proceeds to step 304.

When defining a table with an internal LOB column, the client may specify custom storage characteristics for the LOB column. Such characteristics include, for example, an in-table flag, an in-table threshold size, a location designator, a chunk size and a version-percentage. The in-table flag indicates whether small LOBs that belong to the column should be stored in the table itself. If small LOBs are allowed to be stored in the column, then the in-table threshold size may be used to specify the size threshold that determines whether a LOB is stored within the table or outside of the table.

The location designator designates the storage area ("tablespace") that is to be used to store the LOBs from the column that are too large to store in the table. The LOB chunk size indicates the size of directly accessible, separately storable portions of LOBs that belong to a given LOB column. The version-percentage indicates the maximum percentage of LOB storage that may be used for versioning.

At step 304, it is determined whether the client issuing the create table command has specified customized storage characteristics for each of the internal LOB columns. If the client issuing the create table command has specified customized storage characteristics for the internal LOB columns, then control proceeds to step 308. If the client issuing the create table command has not specified customized storage characteristics for one or more internal LOBs, then control proceeds to step 306.

At step 306, the default storage characteristics are established for all internal LOB columns for which the user did not specify customized storage characteristics. The default storage location for LOBs from a particular LOB column may be, for example, the same tablespace that is being used to store the table that contains the LOB column. Typically, default storage characteristics will already have been established for the default tablespace. The default storage characteristics may specify, for example, a chunk size of 4K, and that all LOBs smaller than 4 K be maintained in the table while all LOBs greater than 4 K be stored outside the table.

For the purpose of explanation, it shall be assumed that the client that requests the creation of the "emp" table further specified the following customized storage specification:

```
LOB (picture) store as
    (tablespace pic_ts
    storage (initial 10M next 10M)
    chunk 12K
    disable storage in row
    PCTVERSION 20
    )
```

In this customized storage specification, the tablespace "pic_ts" has been designated as the storage area that will store LOBs from the picture LOB column.

The statement "chunk 12K" indicates that the picture LOBs will be divided into separately stored and separately accessible 12 K chunks. Assuming a disk block size of 4K, each LOB chunk will consist of three contiguous disk blocks.

The statement "disable storage in row" indicates that no picture LOBs are to be stored in the table, regardless of the size of the picture LOBs. The PCTVERSION 20 statement indicates that no more than twenty percent of the total picture LOB storage is to be used for storing non-current versions of LOB data.

The statement "storage (initial 10 M next 10 M)" specifies that initially 10 Megabytes is to be allocated for storing the picture LOBs and that the next extent to be allocated is also 10 Megabytes.

In step 308, the default storage characteristics are established for all internal LOBs for which custom storage characteristics were not specified. In the present example, the customized storage specification only specifies custom storage characteristics for the "picture" internal LOB column. Consequently, the default storage characteristics would still be used for the "resume" LOBs.

In step 310 the table is populated with one or more rows. The process of populating a table that contains LOB columns will be described in greater detail with reference to FIG. 4.

Figure 4:
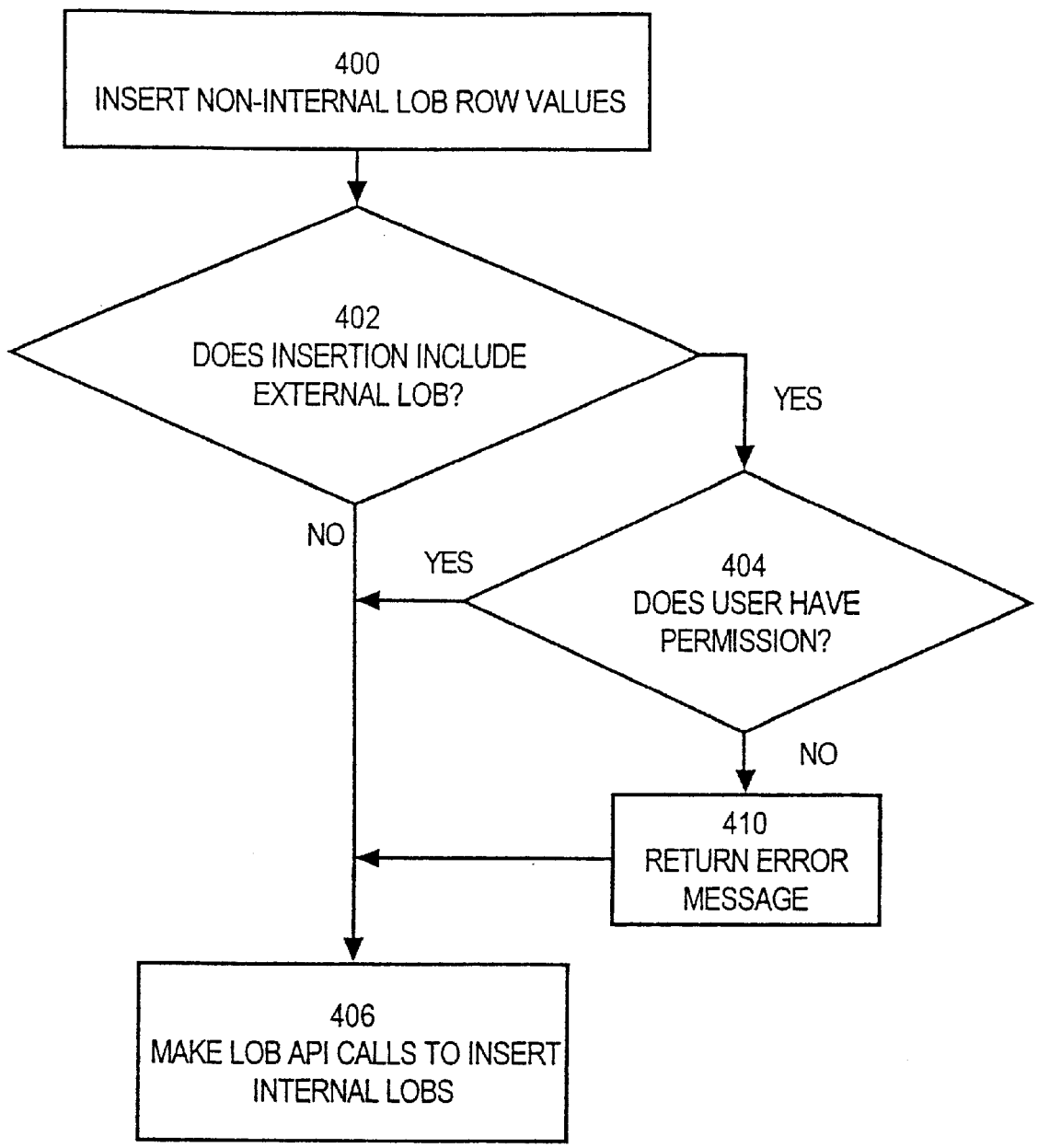
FIG. 4 is a flow chart illustrating steps for inserting LOB data into a table according to one embodiment of the invention.

Referring to FIG. 4, the client begins populating a table that contains LOB columns by inserting non-LOB values into columns using conventional database insertion statements (step 400). These statements initialize, but do not actually insert values into the internal LOB columns. For example, values for an employee with an empid of ten may be inserted by the statement:

```
INSERT INTO emp VALUES
    (10, empty_blob(), empty_clob(), bfilename('IMAGE', 'file.dat'))
    RETURNING picture INTO a_blob;
```

In response to this statement, the database server creates a new row in table "emp" and inserts the value "10" into the empid column of the new row. The parameters empty_blob( ) and empty_clob( ) cause internal LOB locators to be stored in the picture and resume columns but no data is inserted into the LOB.

According to one embodiment of the invention, a user may insert LOB data into internal LOBs within the insert statement. For example, if the parameter "empty_clob( )" is replaced with "abcde", then a clob would be created and the value "abcde" would be stored in the clob.

The statement "bfilename('IMAGE', 'file.dat'))" causes an external LOB locator to be stored in the a_file column of the new row. The "image" parameter is a directory alias that indicates the directory that stores the specified file. The directory alias must have previously been mapped to an actual directory by a statement such as:

CREATE DIRECTORY image AS '/home/images';

When a user attempts to use a locator to access the specified external LOB, the server checks the alias-to-permission mapping to determine whether the user submitting the insert statement has permission to access data contained in the directory associated with the specified alias (step 404). If the user does not have the required permission, then an error message is returned (step 410). The permission for a user "a_user" to read files from the directory associated with the alias "image" may be established, for example, by the database administrator submitting the following statement to the server:

GRANT READ ON image TO a_user;

USING A LOCATOR TO UPDATE A LOB

When inserting a new row, the client can request the server to return zero or more of the locators that were created in the new row. In the present example, the statement "RETURNING picture INTO a_blob" requests the server to store into the variable "a_blob" the newly initialized locator from the "picture" column of the newly created row. This statement assumes that variable a_blob has previously been declared to be of type "blob" by a statement such as "DECLARE ablob blob".

Once the initialized locator for the picture LOB is returned to the client, the client may use the locator to make LOB API calls to the server to perform operations on the LOB, including writing data to the LOB (step 406). For example, the client can write an actual picture into the new row by issuing the statement:

OCILobWrite(a_blob, amount, offset, buffer, buflen, user_callback_fnt( ));

The rowid value within a locator is used to verify that the row to which a LOB belongs is locked before the LOB is updated. This check is necessary when a client updates a LOB by making a call though an API, rather than by issuing a standard database statement to the server. While a server's normal statement processing mechanism will implicitly lock a row that contains data to be updated, the LOB update routines provided in the API must explicitly verify that the appropriate row is locked, since the LOB itself may not actually reside in the row.

According to one embodiment of the invention, clients are required to issue a standard database statement to lock a row before attempting to update a LOB that belongs to the row. In database servers that support the SQL database language, the appropriate row may be locked, for example, by the client issuing an "UPDATE" or "SELECT FOR UPDATE" SQL statement to the database server.

When a client attempts to update a LOB, the client makes a call to a LOB update routine provided by the server's LOB API. In making the call, the client passes the locator of the LOB to be updated back to the server. Before proceeding with the update, the server reads the table-id and rowid values from the locator. The server then determines whether the specified row of the specified table is locked. If the row is locked by the client that issued the LOB update request, the server proceeds with the LOB update operation. If the row is not locked, or is locked by another client, then the server sends an error message back to the client.

According to an alternative embodiment, the server only sends an error message back to the client when the row to which the LOB belongs is locked by another client. If the row is not locked, then the server obtains a lock on the row for the client that issued the LOB update request. Once the appropriate lock is obtained, the server proceeds with the LOB update operation.

According to yet another embodiment, the server does not send an error message when another client holds a lock on the row. Instead, the server places the client on a waiting list to obtain the lock. When the client arrives at the head of the waiting list, the update operation may proceed. If the client is waiting for the lock for more than a predetermined period of time, the server may remove the client from the waiting list and send an error message back to the client.

In the LOB API call "OCILobWrite(a_blob, amount, offset, buffer, buflen, user_callback_fnt( ))", the "a_blob" parameter passes back to the server the locator of the LOB on which the operation is to be performed. In the present example, the a_blob locator will contain, among other things, the table-id for the emp table and row identifier of the newly inserted row for the employee with empid 10. The "amount" parameter specifies how much data is to be written. The "offset" parameter specifies the relative position within the LOB to begin writing the new LOB data. The buffer parameter identifies a buffer, if any, that contains the data to be written to the LOB. The "buflen" parameter identifies the size of the buffer. For nclobs, a write request may include the additional parameters "charsetid" and "charsetform" to respectively identify the character set and the form (CHAR or NCHAR) of the character data in the buffer that will be inserted.

The "user_callback_fnt( )" identifies a function on the client-side that the database server calls to retrieve the LOB data. If all of the data to be written fits in the specified buffer, then no callback function needs to be supplied. If a callback function is provided, then the server invokes the callback function after reading all of the data from the buffer. When called, the callback function refills the buffer with more data that is then supplied to the server. This process is repeated until the server has received and written all of the LOB data specified. According to one embodiment, the callback function includes parameters to indicate to the server how much data was placed in the buffer and whether the currently buffered data is the last set of data to be supplied.

After performing the update to the LOB data, the server updates the snapshot time stored in the LOB locator to reflect the point in time after the operation was completed. The updated locator is then passed back to the client. As mentioned previously, updating the locator with the new snapshot time allows subsequent accesses to the LOB data using that locator to see the updates previously made to the LOB data through that locator.

XII. OBTAINING LOCATORS FROM ALREADY-EXISTING ROWS

In the example given above, the client obtains the locator for an internal LOB by requesting the return of the locator for a new row as part of the statement that creates the new row. According to one embodiment of the invention, the server also supports statements that return locators for LOBs that belong to already-existing rows. For example, a user may submit the statements:

```
DECLARE
    buffer      RAW(2000);
    image1      BLOB;
    offset      INTEGER := 1;
    image_no    INTEGER:=101;
    amount      INTEGER := 1000;
BEGIN
    SELECT picture INTO image1 FROM emp
        WHERE empid = 10 FOR UPDATE;
    /* initialize buffer with data to write to the LOB */
    DBMS_LOB.WRITE(image1, amount, offset, buffer);
END
```

In this example, the server will search the table "emp" for rows where the empid is equal to 10. When such a row is encountered, the server will return to the client the locator for the internal LOB stored in the "picture" column of that row. Specifically, the locator will be stored into the "image1" variable. The subsequent DBMS_LOB.WRITE call will store data into the LOB associated with the returned locator in the manner described above. This process will be repeated for all rows with empids equal to 10.

XIII. LOB API ROUTINES

The LOB routines described herein are merely exemplary. The actual LOB routines may vary from implementation to implementation. Alternative LOB routines may be provided in addition to or instead of those described herein without departing from the present invention. For example, an alternative technique to load data into an internal LOB is exemplified by the following statements:

declare a_bfile=bfilename ('IMAGE', 'somefile.dat');
begin DBMS_LOB.LOADFROMFILE (ablob, a_bfile, src_offset, dst_offset, amount);

In this example, the variable a_bfile is assigned a locator for the external LOB stored in the file "somefile.dat" located in the directory associated with the alias "image". The call to "DBMS_LOB.LOADFROMFILE" passes to the server a locator for the internal LOB "ablob", and causes the server to copy data from the external LOB identified by "a_bfile" into the internal LOB identified by "ablob". The src_offset parameter specifies the offset into the external LOB from which to start retrieving data. The dst_offset parameter specifies the offset into the internal LOB at which to begin writing data. The amount parameter specifies how much data is to be written from the external LOB to the internal LOB.

XIV. USING LOCATORS WITH VIEWS

Assume that a table "emp" includes information about employees. Some of the information about each employee, such as the employee's salary, may be sensitive, while other information, such as the department in which the employee works, is not. If security is only implemented on a table-by-table basis, then each user would either have access to both the sensitive and non-sensitive employee information, or would have access to neither the sensitive nor the non-sensitive employee information.

A view is a customized presentation of data from one or more tables. Views do not actually contain data, but simply derive data from the tables on which the views are based. One use of views is to enforce security in a database system. For example, a view may be used to overcome the inefficiency of a strict table-by-table security mechanism by allowing users that are not authorized to access all data in a table to access a selected subset of data from the table. For example, assume that a view is defined to contain data from all of the non-sensitive columns of the employee table. The database administrator can grant all users permission to access the view, even though only a selected set of users have access to the table on which the view is defined.

Because the permissions associated with views may be different than the permissions associated with the tables from which the views derive data, it is important to know whether a locator is supplied to a client directly from the table to which the corresponding LOB belongs, or from a view that is defined on the table. Therefore, each LOB locator includes data that identifies the view, if any, from which the client gained access to the corresponding LOB.

As described previously, the following fields are used to store view information within a dynamic internal LOB locator according to an embodiment of the invention:

"v_objn": The v_objn field stores the object-number for a view from which a LOB is retrieved.

"v_icol": The v_icol field stores a value to indicate to which column of a view the LOB belongs.

"v_hash": The v_hash field is a hash value used to ensure that the LOB locators sent back to the server from clients have not been tampered with by the clients.

XV. STATELESS SERVER-SIDE USE OF LOCATORS

According to one embodiment of the invention, the server does not maintain state information to indicate which locators have been supplied to each client. Rather, the state information is stored in the dynamic version of the locator, and the dynamic version of the locator is delivered to and stored in the client. Consequently, the amount of server-side resources consumed by the use of locators is reduced.

The server-side resources saved because the server does not store LOB state information for every locator delivered to a client may be significant, particularly when clients perform operations on a relatively small percentage of the LOBs for which they are supplied locators. For example, a user may issue a query that causes hundreds of locators for LOBs containing pictures to be delivered to the client, but the client may only request one of those pictures to be displayed.

When a client uses a locator to perform an operation on a LOB, the server must check to see if the client has permission to perform the requested operation. If the client requests a subsequent operation on the same LOB, the server must repeat the permission check. In practice, a LOB that has been accessed by a client once is much more likely to be accessed again by the client than a LOB that has not yet been accessed by the client. Thus, while it may be preferable to avoid the storage of state information for locators that have merely been supplied to clients, it may also be preferable to avoid repetitive operations, such as repeating the same permission check, by storing state information for those LOBs that have actually been accessed by clients.

According to one embodiment of the invention, redundant security checking operations are avoided by causing the server to store state information about a LOB in response to a client actually requesting an operation on the LOB. Thus, the first time a client requests an operation on a particular LOB, a privilege check is performed and results of the privilege check are stored in a cache within the server. When the client requests a subsequent operation on the same LOB, the server does not re-execute the privilege check, but rather inspects the cache for the permission information. If the permission information is not stored in the cache, or if the permission information for the LOB in question has been invalidated, then the server performs the privilege check. The permission information for a LOB that is stored in the cache may be invalidated by the server in response to various events that occur after the permission information was stored in the cache. Such events include, for example, a change in the permissions associated with the table to which the LOB belongs, the deletion of the table to which the LOB belongs, and other changes to the logical characteristics of the LOB column or table.

Even if state information is only stored for LOBs on which actions have actually been requested, the state information may consume an unacceptable amount of memory. Because the state information can by dynamically reconstructed, the cache is entirely optional. Consequently, the size of the cache may be adjusted as desired, or no cache may be used. According to one embodiment, resources are preserved by placing a limit on the amount of memory that may be used to store state information. If all of the memory allocated for storing LOB state information is used, newly generated state information is written over old LOB state information. Various techniques, such as Least Recently Used (LRU) techniques, may be used to determine which old state LOB information is overwritten. If a client requests an operation on a LOB and the state information generated in response to the client's previous access to the LOB has been overwritten, the server will once again perform the privilege check and store state data that reflects the outcome of the privilege check.

XVI. LOCATOR ENCRYPTION

Unfortunately, because the database server does not keep track of which locators have been sent to which clients, the clients are free to manipulate and/or corrupt the locators. For example, a particular client may not be allowed access to a particular table through a particular view. The client may request the locator of a LOB stored in a view through which the client is not authorized to access the table. Upon receiving the locator, the client may change the view in the locator to a view through which the user can access the table. The client may then send the locator to the server in a request to retrieve the restricted LOB. Because the server has no record of which locator was actually sent to the client, the server cannot compare the locator in the received request against the locator that was supplied to the client. If no additional security mechanism is provided, the server would proceed to supply the restricted data to the client in response to the request containing the manipulated locator.

To prevent the use of manipulated or corrupted locators, a privilege check mechanism is provided to detect whether locators received by the database server from clients have been manipulated or otherwise corrupted by the clients. According to one embodiment of the invention, a hash value, stored in the "v__hash" field of the locator, is used to detect when clients have performed illegal operations to LOBs that were selected through a view. Specifically, when the database server constructs a in-memory locator in response to a request from a client, the server applies the values from sensitive fields of the locator, such as the object-number, table-id, and v__objn, to a hash function to produce a hash value. The hash value thus produced is stored in the v__hash field of the locator, and the locator is sent to the client.

When the client sends a request to the server to perform an operation on a LOB, the client submits the locator for the LOB with the request. Before processing the request, the server applies to the hash function the values stored in the sensitive fields of the locator received from the client to produce a second hash value. The second hash value is compared to the hash value contained in the v__hash field received from the client. If the two hash values match, then the locator is considered valid and the server proceeds to use the information contained in the locator to determine whether the client is allowed to perform the requested operation.

On the other hand, if the second hash value does not match the hash value in the v__hash field of locator received from the client, then the locator was tampered with or otherwise corrupted by the client. Under these conditions, the server sends an error message to the client and does not process the request.

XVII. USING LOB LOCATORS TO ACCESS EXTERNAL LOBS

According to one embodiment of the invention, external LOBs are accessed through use of directory aliases. Before performing an operation on an external LOB, the client must provide the full directory path to where the external LOB resides. However, full path names may be relatively long, and therefore cumbersome to repeatedly specify in API calls. Therefore, a mechanism is provided through which a client may specify an alias for a full path name. Once an alias has been established, the client may use the alias to specify the path when the full path name would otherwise be required.

For example, assume that an external LOB is located in the directory c:\users\johnson\project1\testprogs\images. A client that plans to perform operations on the LOB may issue a command "CREATE DIRECTORY images AS c:\users\johnson\project1\testprogs\images". In response to this command, the server stores data that establishes a correlation between the alias "images" and the path "c:\users\johnson\project1\testprogs\images". Once the mapping of the alias to the path has been established, the alias "images" may be used in all subsequent operations to identify the path of the external LOB.

In addition to reducing the amount of storage used by external locators, directory aliases allow external LOBs to be moved without having to update all on-disk external locators for the moved LOBs. For example, if all of the employee pictures are moved from "c:\users\johnson\project1\testprogs\images\" to "d:\mystufft\images", then the locators associated with all of the pictures can be effectively updated by changing the mapping of the alias "images" from "c:\users\johnson\project1\testprogs\images\" to "d:\mystuff\images".

As explained previously, the locator for an external LOB stores both the directory alias and the filename of the external LOB. This information, combined with the alias-to-directory mapping maintained by the server, allows the server to operate on external LOBs without having to repeatedly read data from the table to which the external LOB belongs.

For example, assume that pictures for all of the employees listed in an employee table are stored external to the database. A client may issue an SQL "SELECT" statement on the employee table to retrieve pictures for all employees with the last name of "Johnson". Rather than send the actual pictures to the client, the server generates dynamic external LOB locators for each employee named "Johnson". Each of the dynamic external LOB locators includes the data retrieved from an on-disk external LOB locator that is stored in the employee table.

Once the client has received the external LOB locators, the client may perform operations by making calls to the server's LOB API. To perform an operation on the picture of a particular Johnson, the client makes an API call which passes back to the server the locator for the external LOB at issue. The server retrieves the directory alias from the locator and inspects the alias-to-directory mapping to determine the directory in which the external LOB resides. The server also retrieves the filename from the locator. With the filename and the full directory, the server can access the external LOB through the operating system without having to once again access the employee table to which the external LOB belongs.

According to one embodiment of the invention, directory aliases are also used to enforce security. Specifically, the server maintains an alias-to-permissions mapping. Before performing an operation requested by a client on an external LOB, the server reads the alias from the locator received from the client and inspects the alias-to-permissions mapping to determine whether the client requesting the operation has permission to perform the requested operation. If the client does not have permission to perform the operation, then an error message is returned to the client.

Because external LOBs are stored outside of the database, they are subject to any security mechanisms provided by the operating system. For example, the operating system may establish directory access permissions on a user-by-user basis. For a database server to operate accurately with the external LOBs, the operating system security mechanism must grant the database server at least as much permission as the database server grants to any user with respect to any given directory. For example, if the alias-to-permission mapping grants a client read access to external LOBs in a particular directory, then the operating system must at least grant to the database server read access to that particular directory.

XVIII. LOB COLUMN INDEXES

Index 202 is an index built on LOB column 206 according to an embodiment of the invention. Structurally, index 202 may be any type of index, including a B–tree, B+tree or hash index. However, index 202 differs from conventional indexes in that the key in each index entry (in this case, the "lobid") is followed by a series of pointers, rather than a single pointer or row identifier.

Each pointer in the series of pointers within an index entry corresponds to the beginning of a directly accessible chunk of (i.e., an "entry point" into) the LOB associated with the index entry. For example, index entry 208 includes LOBID2 followed by four pointers (ADD1 through ADD4). LOBID2 is the lobid of TINA's picture. Consequently, the four pointers within index entry 208 respectively point to the beginning of the first four 4 K LOB chunks of TINA's picture.

In the illustrated example, the index entries of index 202 have a size limit that allows a maximum of four pointers to be stored in any given index entry. Since TINA's picture consists of seven 4 K chunks, index 202 includes a second index entry 210 that stores three pointers that respectively point to the fifth, sixth and seventh 4 K chunks of TINA's picture.

In a similar manner, the index entries within index 202 contain separate pointers to each 4 K chunk of each LOB that belongs to LOB column 206 and is stored in LOB data storage 204. For example, index 202 contains an entry 212 that contains pointers to the beginning of the four 4 K chunks of BOB's picture, and an entry 214 that contains pointers to the beginning of the three 4 K chunks of LEE's picture.

Similar to traditional indexes, the use of index 202 avoids the need to scan table 200 before accessing the data of a particular LOB. In addition, the use of index 202 significantly reduces the amount of time spent scanning for a specified portion of the LOB data. For example, assume that a client issues a request to read 2 K of TINA's picture, beginning 12 K into TINA's picture. In response to this request, the database server traverses index 202 based on the lobid of TINA's picture (LOBID2) to arrive at index entry 208. Based on the chunk size (4K) associated with LOB column 206, the database server knows that the fourth pointer (ADD4) within index entry 208 will point to the beginning of the LOB chunk that begins 12 K into TINA's picture. Therefore, the database server follows pointer ADD4 and reads 2 K beginning at the address identified by pointer ADD4.

XIX. INDEX ENTRY FORMAT OF LOB COLUMN INDEXES

For the purposes of explanation, the index entries of index 202 are shown to merely contain lobids followed by pointers. However, the combination of the lobid and a pointer number associated with the first pointer within an index entry may be used as the key value for the index entry. The pointer number associated with a pointer indicates the relative position within a LOB of the LOB chunk pointed to by the pointer. For example, the pointer numbers for pointers ADD1, ADD2 and ADD3 may be "0", "1", and "2" because ADD1, ADD2 and ADD3 respectively point to the first, second and third chunks of the LOB associated with LOBID2. Thus, the key values for index entries 208, 210, 212 and 214 may respectively be "LOBID2,0", "LOBID2,4", "LOBID4,0", and "LOBID5,0". When the server allocates contiguous storage for LOB data, the numeric order of the pointer values will correspond to the relative order within a LOB of the LOB chunks pointed to by the pointers. Therefore the first pointer within an index entry may be used as the pointer number which is combined with the lobid to form the key of the index entry.

By including a pointer number within the key of the LOB index, the index is allowed to store index entries for any given LOB across more than one leaf node of the LOB index. Specifically, if only the lobid is used as a key, then all traversals made using the same lobid would end at the same leaf node. However, when the combination of the lobid and the pointer number are used as the key, then branch nodes may contain separators such as "LOBID2,7", which would cause traversals based on keys "LOBID2,0" through "LOBID2,6" to end at leaf nodes on one side of a branch while traversals based on keys "LOBID2,7" through "LOBID2,∞" end at leaf nodes on the other side of the branch.

XX. USING VERSIONING TO PROVIDE CONSISTENT VIEWS OF INTERNAL LOBS

As explained above, the server must be able to supply LOB data from internal LOBs to clients as the LOB data existed at a specified snapshot time. To be able to supply non-current versions of LOB data to clients, the old LOB data cannot be overwritten when new LOB data is written into the LOB.

According to one embodiment of the invention, LOB versioning is performed by causing the database server to make a copy of a chunk of LOB data before the chunk of LOB data is modified. The server then makes the specified modification to the new copy of the LOB chunk, while the old copy of the LOB chunk remains unmodified. In response to making the change to the new LOB chunk, the pointer that points to that particular LOB chunk is updated in the appropriate index entry to point to the new copy of the LOB chunk. Consequently, subsequent operations that access that LOB chunk through the current version of the LOB index will be directed to the most recently modified version of that LOB chunk.

If old versions of LOB data are maintained indefinitely, the LOB data will eventually consume an unacceptably large amount of storage. Therefore, the database server allows the client that creates a LOB column to specify a maximum amount of storage to be used for storing old LOB data for the LOBs that belong to the column. According to one embodiment, a client is able to specify, through a parameter "PCTVERSION" the maximum storage for old LOB data as a percentage of the total amount of storage for the LOB data.

The value specified for PCTVERSION determines the percent of all used LOB data space that can be occupied by old versions of LOB data chunks. As soon as old versions of LOB data chunks start to occupy more than the PCTVERSION amount of used LOB space, the database server tries to reclaim and reuse the storage containing old versions of LOB data chunks. For example, assume that LOB data for a particular column currently occupies ten megabytes of storage. Assume that the PCTVERSION for that column is set at ten percent, and that one megabyte of the ten megabytes stores old LOB data. Under these conditions, if a LOB data chunk is updated, the newly modified copy of the LOB data chunk will be stored over old LOB data, rather than in newly allocated storage. On the other hand, if only 500 k of the ten megabytes stores old data, then the newly modified copy of the LOB data chunk will be stored in newly allocated storage.

Various selection strategies may be used to determine which old LOB data chunk should be overwritten when the percentage of old LOB data exceeds the percentage specified in the PCTVERSION value. For example, the oldest non-current LOB data chunk in the LOB storage may be selected to be overwritten. Alternatively, the server may select to overwrite the oldest version of the LOB data chunk that has the most old versions. For example, ten versions of a particular LOB data chunk may exist. The server may select the oldest version of the ten versions to be overwritten, even though that version may not be the oldest non-current LOB data chunk in the LOB storage.

Because old versions of LOB data are eventually overwritten, it is possible for the server to receive requests for LOB data that is no longer available. For example, assume that at time T15 the server receives a request for a LOB data chunk from LOB1 as of time T1. The oldest version of the requested LOB data that has not been overwritten may reflect updates made at time T2. Under these conditions, the server cannot supply the requested version of LOB data to the client. Therefore, the server returns an error message to the client.

XXI. USING UNDO INFORMATION TO PROVIDE CONSISTENT VIEWS OF LOB INDEXES

As mentioned above, when a chunk of LOB data is to be modified, a copy of the LOB chunk is made and the modification is applied to the copy of the LOB chunk. In order for future operations on the LOB chunk to be performed on the most recent version of the LOB chunk, the index pointer that was followed to the old version of the modified LOB chunk must be set to point to the new version of the modified LOB chunk.

Figure 5:
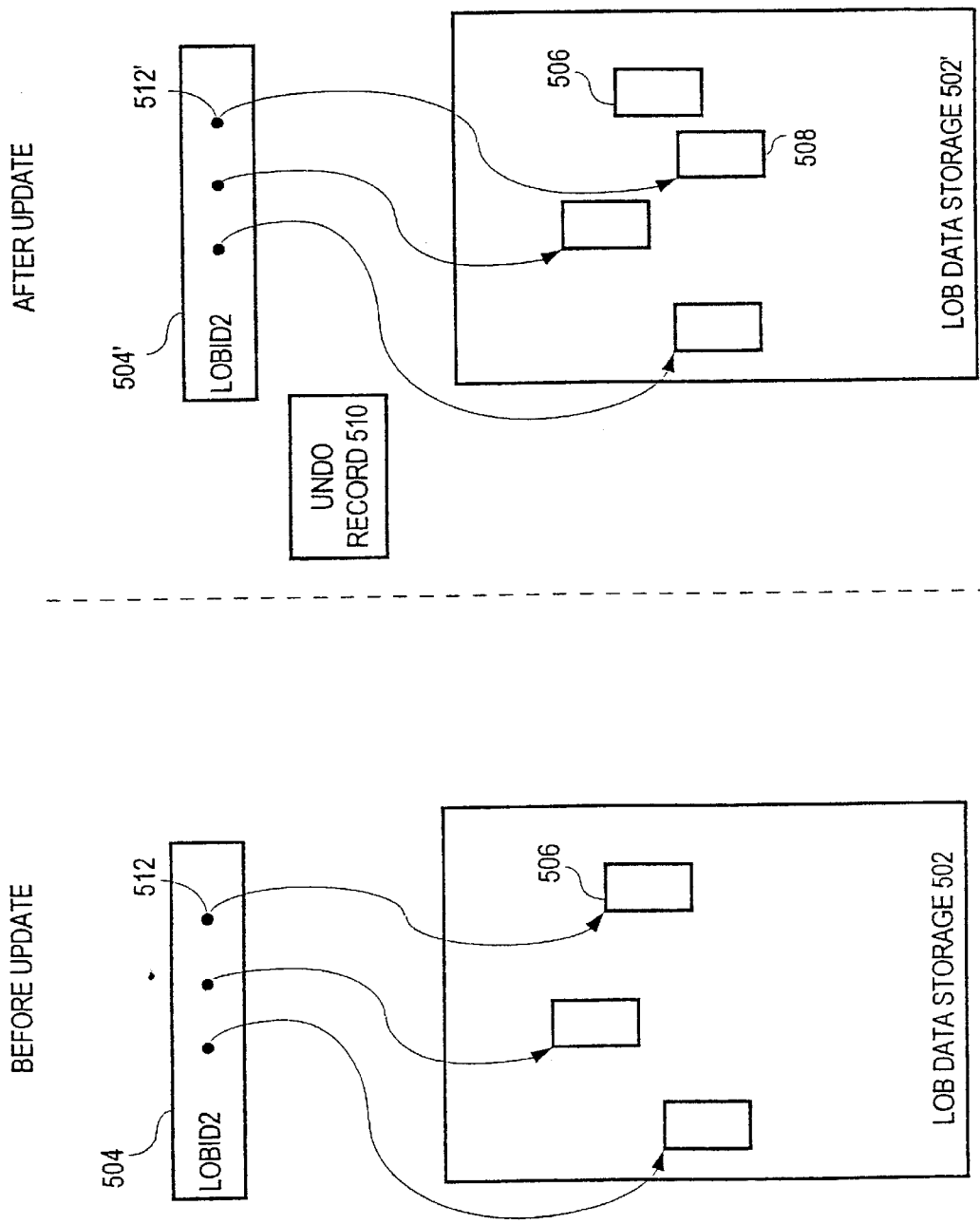
FIG. 5 is a block diagram illustrating the generation of undo for changes to a LOB index in combination with versioning of LOB data, according to one embodiment of the invention.

Referring to FIG. 5, it is a block diagram that illustrates the changes made in response to an update to a particular LOB chunk. In the illustrated example, a LOB chunk of a LOB with a lobid "LOBID2" is updated. By traversing a LOB index built on the column that contains the LOB, the appropriate index entry 504 associated with LOBID2 is found. The index entry 504 includes a pointer 512 that indicates that chunk block 506 within LOB data storage 502 is the current version of the LOB chunk to be updated.

The current version of the LOB chunk is read from chunk block 506 identified by the pointer 512, modified in volatile memory, and stored back to a different location 508 in LOB data storage 502. The pointer 512 in the index entry 504 is then modified to point to the chunk block 508 containing the updated version of the LOB chunk. Because pointer 512 is updated, the next time index entry 504 is used to access that particular LOB chunk, the updated version of the LOB chunk will be accessed at chunk block 508, rather than the old version of the LOB chunk that remains in chunk block 506.

As mentioned above, it is desirable to allow clients to access versions of a LOB other than the most recent versions. In particular, it is desirable to allow clients to specify a particular snapshot of a LOB, and to deliver to the clients LOB data from that particular snapshot. However, when pointers in the LOB index are updated in response to creating new versions of LOB chunks, the LOB index can no longer be used to locate the older versions of LOB chunks that belong to a particular snapshot.

For example, assume that the update illustrated in FIG. 5 is made at time T2, and that at time T3 a client requests access to that particular LOB chunk as it existed at time T1. If at time T3 the LOB index is used to locate the LOB chunk, the new version of the LOB chunk will be retrieved from chunk block 508. This would be an error, because the LOB chunk at chunk block 508 reflects the update made at time T2 and therefore does not belong to the specified snapshot. The version of the LOB data that belongs to the specified snapshot is stored in chunk block 506.

According to one aspect of the invention, undo records are generated during updates to LOB indexes to allow LOB indexes to be used to access non-current versions of LOB data. An undo record contains data that identifies the portion of the LOB index that was modified, the time the modification was made, and how to remove or "undo" the modification. According to one embodiment, such undo records are generated every time a portion of the LOB index is modified. When a portion of the index that has been modified in volatile memory is stored back to non-volatile memory, then the undo records generated for all of the updates made to that portion of the index while in volatile memory are also stored to non-volatile memory.

Returning to the example shown in FIG. 5, an undo record 510 is generated in response to the update made to pointer 512 in index entry 504. Undo record 510 identifies the portion of the index that was modified, the time at which the modification was made, and how to undo the modification.

In the present example, the portion of the index that was changed was the index entry 504, and in particular, the pointer 512 within the index entry 504. Various techniques may be used to record within undo record 510 the identity of the data that was modified. For example, the address of the disk block on which pointer 512 is stored may be stored within undo record 510. Alternatively, data identifying index entry 504 may be stored in undo record 510. The present invention is not limited to any particular set of data for identifying within an undo record the portion of the LOB index that was modified.

In the present example, undo record 510 further includes a time value that indicates the time at which the update to the LOB chunk was made permanent. In some database systems, the time that a change is made permanent may be different than the time at which the change was actually performed, since a change is not considered permanent until the transaction performing the change has committed. In the present example, it shall be assumed that the update to index entry 504 was made permanent at time T2.

Undo record 510 also includes undo information that indicates how to "undo" the update associated with the undo record. In the present example, the undo information for undo record 510 indicates that pointer 512 must be reconstructed to point to chunk block 506.

By maintaining undo records for all changes made to a LOB index, clients are able to access the LOB index as it existed as of a particular snapshot time. When reconstructed as of the particular snapshot time, the index will accurately point to storage that contained the versions of LOB chunks that were current as of that particular snapshot time. Therefore, by following the pointers in the reconstructed index entries, the appropriate version of LOB data can be accessed for a client.

Returning to the example given above, assume that at time T3 a client wants to see a LOB chunk from the snapshot associated with time T1. Assume also that the LOB data stored at chunk block 506 was updated at time T2. Under these conditions, the server would traverse the LOB index based on the key "LOBID2". Each node of the index read during the traversal would be reconstructed to reflect how the node appeared at time T1. For nodes that had not been modified since time T1, no undo records would be applied. For nodes that had been modified since time T1, the undo records for all updates subsequent to time T1 would be applied.

Following this process, the leaf node containing index entry 504 would be reconstructed by applying the undo information within undo record 510 to the index entry 504. After the undo record 510 is applied, the pointer 512 will again point to chunk block 506. Because the client will be supplied the LOB chunk from chunk block 506, the client will not see the change made a time T2 (which is reflected in the LOB chunk stored at chunk block 508).

While a reconstructed index entry will accurately point to the storage location that held a particular LOB chunk as of a particular time, the LOB data at that storage location may have been overwritten after that particular time. Therefore, the lobid and version number stored in the storage location are compared to the lobid and version number specified in the request. If the lobid and version number stored at the storage location indicate that the desired LOB data has been overwritten (e.g. the lobids do not match or the stored version number is greater than the desired version number), then a "snapshot too old" error is returned to the client.

XXII. RECOVERING REUSABLE BLOCKS THAT HELD LOB DATA

When the server needs to store new LOB data, the server determines whether the PCTVERSION percentage has been exceeded. If the PCTVERSION percentage has not been exceeded, then the server allocates unused blocks to store the new LOB data. If the PCTVERSION percentage has been exceeded, then the server reuses blocks that contain old versions of LOB data. To conserve resources, the server must keep track of which blocks within LOB data storage 204 may be reused to store new LOB data (i.e. which blocks are "reusable").

As mentioned above, storage for a new version of a LOB chunk is allocated every time a LOB is modified. The blocks containing the old version of the LOB chunk cannot immediately be reused because the transaction that made the modification to the LOB may not complete successfully. If the transaction that made the change is rolled-back for any reason, the old version of the LOB chunk must be available. Therefore, the blocks containing old versions of LOB chunks are not reusable until the transactions that modified the old versions commit.

For example, assume that a transaction TX1 performed the update illustrated in FIG. 5 at time T2. After time T2, the new version of the LOB chunk is stored at chunk block 508. At this point in time, chunk block 506 is not reusable because TX1 has not yet committed. Specifically, if TX1 fails to commit, then the changes made by TX1 must be removed from the database. As part of such a removal process, undo record 510 is applied to index entry 504 to cause pointer 512 to point to chunk block 506. Chunk block 506 must therefore continue to store the pre-update version of the LOB chunk.

On the other hand, assume that TX1 commits at time T3. Because TX1 committed, the LOB data stored at chunk block 506 is no longer required to ensure that TX1 can be rolled-back. Therefore, at time T3 chunk block 506 becomes reusable.

According to one embodiment of the invention, a to-be-reused list is maintained for each transaction. When a transaction makes an update to a LOB chunk, the blocks that stored the LOB chunk before the update are added to the to-be-reused list of the transaction. When the transaction commits, the blocks on the to-be-reused list of the transaction are added to a list of reusable blocks.

The act of "adding" the to-be-reused list to a list of reusable blocks may be implicit. Specifically, when a transaction makes an update to a LOB chunk, the blocks that stored the LOB chunk before the update may be immediately placed in a reusable block list, but not made visible for the purpose of reusing the blocks. When the transaction commits, the blocks, which are already on the list of reusable blocks, are made visible for the purpose of reusing the blocks.

XXIII. USING INDEX ENTRIES TO INDICATE REUSABLE BLOCKS

According to one embodiment of the invention, the server maintains the LOB index in a way that allows the LOB index to store lists of reusable blocks. Specifically, the LOB index is used to store both "used block entries" and "reusable block entries". Used block entries are index entries, such as those described above, that contain pointers to where the LOB chunks associated with a particular LOB are currently stored. Reusable block entries, on the other hand, are index entries that contain pointers to storage locations that may be reused to store new LOB data.

To differentiate between used block entries and reusable block entries, a group identifier ("group-id") is stored in the key of each index entry in addition to other key value data, and reusable block entries are assigned different group-id values than used block entries.

According to one embodiment, the key for a reusable block entries also differs from the key for a used block entries in that the key for reusable block entries includes a time-stamp value in place of a lobid. The time-stamp value in a reusable block entry indicates the relative time at which the blocks identified in the entry were placed in the list of reusable blocks. In the example given above, chunk block 506 was placed in the reusable list at time T3, so a timestamp value indicating time T3 is stored in the key of the reusable block entry that includes a pointer to chunk block 506.

XXIV. SEGREGATING REUSABLE LIST GROUPS WITHIN AN INDEX

The index entries of most conventional types of indexes, such as B–Tree indexes, are sorted based on the key values contained in the index entries. According to one embodiment of the invention, the group-id value precedes all other data within the key of every index entry, and therefore has the most significant effect on where an index entry will be located within the LOB index. Thus, the key values in used block entries have the format:

[group-id, lobid, first pointer value]

while the key values in used block entries have the format:

[group-id, time-stamp, first pointer value]

In one embodiment, the last bit of a group-id value is used as a "reusable flag" to indicate whether the index entry is for reusable data blocks. For example, used block entries are assigned group-id values where the last bit is zero, while reusable block entries are assigned group-id values where the last bit is one.

Within a group-id value, the reusable flag is preceded by zero or more other bits used to identify "reusable-list groups". A reusable-list group is a group of blocks for which a separate reusable block list is maintained. The maximum number of reusable-list groups that a LOB index supports is dictated by the number of bits used to store reusable-list group values. If no bits are used, then the LOB index will only have one reusable-list group. If one bit is used, then the LOB index can have two reusable-list groups.

For example, assume that one bit is used for reusable-list group values. Under these conditions, the possible group-id values are 00, 01, 10, and 11. All used block entries in the first reusable-list group will have the group-id value 00 and all reusable block entries in the first reusable-list group will have the group-id value 01. Similarly, all used block entries in the second reusable-list group will have the group-id value 00 and all reusable block entries in the second reusable-list group will have the group-id value 01.

Figure 6:
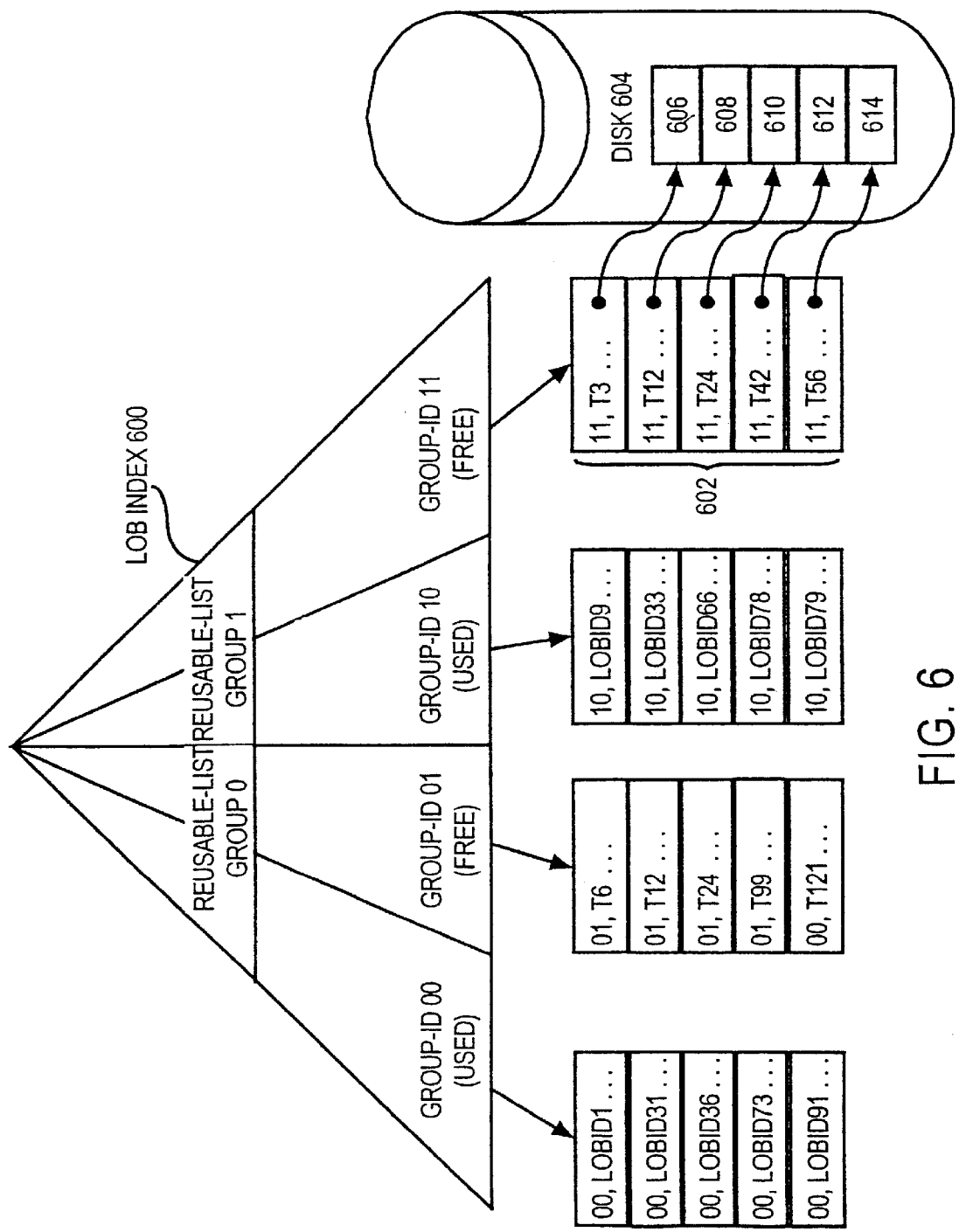
FIG. 6 is a block diagram illustrating the storage of reusable block lists within a LOB index according to one embodiment of the invention.

Because the reusable-list group value precedes the reusable flag in the group-id, and the group-id is the most significant value in the key of the LOB index, the index entries within a LOB index will be segregated as shown in the exemplary LOB index 600 of FIG. 6. Specifically, (1) all of the index entries associated with a reusable-list group will be grouped together, and (2) within each reusable-list group, the used block entries will be separated from the reusable block entries.

In used block entries, the group-id is followed by the lobid. Therefore, the used block entries in each reusable-list group will be sorted based on lobid.

In reusable block entries, the group-id is followed by the time-stamp. Therefore, the reusable block entries in each reusable-list group will be sorted based on time-stamp.

XXV. LEAST RECENTLY USED REUSABLE-LISTS

As explained above, each reusable-list group includes zero or more used block entries, and zero or more reusable block entries. The reusable block entries in a reusable-list group identify the blocks that belong to the "reusable-list" for that reusable-list group. In addition, the order within the LOB index of the reusable block entries corresponds to the order of the blocks within the reusable-list.

For example, the reusable-list group 1 in index 600 includes five reusable block entries 602. The five reusable block entries 602 respectively point to blocks 606, 608, 610, 612 and 614 on disk 604. Thus, those blocks comprise the reusable list for the reusable-list group 1. Further, the order of the reusable list entries 602 dictates the order of the blocks within the reusable-list. Therefore block 606 is currently at the head of the reusable-list of reusable-list group 1, and block 614 is currently at the tail of the reusable-list of reusable-list group 1.

As mentioned above, when a transaction commits, pointers to the blocks on the to-be-reused list of the transaction implicitly become reusable block entries in the LOB index. A timestamp reflecting the time at which the reusable block entries are inserted into the index is placed in the key value of the reusable block entries. This ensures that the blocks within each reusable list will be organized in a Least Recently Used order (this assumes a correlation between the time that a block is freed and the time the block was last accessed). Thus, when blocks are moved (implicitly) from the to-be-reused list of a transaction to a reusable-list in the LOB index, they are located at the tail of the reusable list because their timestamps are more recent than the timestamps of the reusable block entries that are ahead of them in the reusable-list. In the example illustrated in FIG. 6, the timestamp associated with the entry for any given block in the reusable-list of group 1 is higher than the timestamps associated with the entries for the blocks that precede the given block, and lower than the timestamps associated with the entries that for the blocks that follow the given block.

The server is configured to allocate blocks for storing new LOB data by reusing blocks that belong to a reusable list in order, beginning at the head of the reusable-list. For example, if one chunk block was needed for a new LOB chunk, then block 606 would be used to store the LOB chunk. If two blocks were needed, then blocks 606 and 608 would be used. Because the blocks within a reusable-list are in Least Recently Used order, allocating storage from the head of the reusable-lists tends to cause blocks with older versions of data to be reused before blocks with more recent versions of data. Consequently, non-current data is more likely to remain available for reconstructing the versions of LOBs that belong to recent snapshots, and less likely to be available for reconstructing the versions of LOBs that belong to older snapshots.

XXVI. MULTIPLE REUSABLE-LISTS WITHIN A SINGLE INDEX

LOB index 600 illustrated in FIG. 6 includes two reusable-list groups, each of which has its own reusable list. There are a variety of circumstances in which it may be desirable to have multiple reusable-lists, rather than a single reusable-list.

For example, assume that multiple servers have access to the table containing the LOB column on which LOB index 600 is built. Each server will maintain its own counter from which to assign timestamps. Within any given server, the value of the counter increases with time, thereby ensuring that later timestamps will have higher values than earlier timestamps. However, at any given time the counters of different servers may be at significantly different values. Consequently, a timestamp of 45 assigned by one server may actually represent an earlier time than a timestamp of 30 assigned by a different server.

Because there is no correlation between timestamps from different servers, the Least Recently Used ordering of a reusable list will be lost if multiple servers insert reusable block entries into the same reusable-list group. For example, if time T3 on the server that inserted the entry for block 606 was later than time T12 on the server that inserted the entry for block 608, then a more recently used block 606 would be reused before a less recently used block 608.

To maintain the Least Recently Used ordering of the reusable-lists, each server may be assigned its own reusable-list group. Specifically, each server is assigned a different reusable-list group value. When a server adds an entry to the LOB index, the reusable-list group value assigned to that server is stored as the most significant portion of the key within the entry. Consequently, traversing the index based on the key will cause entries from each server to be inserted under a different portion of the LOB index than the entries for other servers. For example, FIG. 6 shows that the entries inserted by the server associated with the reusable-list group value "0" reside in a different portion of LOB index 600 than the entries inserted by the server associated with the reusable-list group value "1". Because each reusable-list will be ordered based on timestamps assigned by a single server, the reusable-lists will accurately maintain a Least Recently Used ordering.

XXVII. REPRESENTING HOLES WITHIN AN INDEX

Using the indexing techniques described above, pointers to the various chunks of a large LOB may be spread over multiple index entries. This presents a problem when a LOB contains a hole for which no LOB data exists.

According to embodiment of the invention, when LOB chunks are erased from the middle of a LOB, the pointers that point to those LOB chunks are replaced with a null value (e.g. zero) in the index entry. As with other deletions, the data blocks containing the "erased" data are placed on the to-be-reused list of the transaction performing the deletion, and implicitly become part of a reusable-list within the LOB index when the transaction commits.

Holes within LOBs may also be created when an operation writes data into the LOB at an address beyond the current end of the LOB. For example, a hole would be created if data was inserted into a LOB beginning at offset 1000, when the current LOB data ended at offset 800.

When the LOB is copied or otherwise manipulated after a hole is created, the manipulation is only performed on LOB chunks identified by non-null pointers. Consequently, the time, space and overhead associated with manipulating LOB chunks that do not actually contain LOB data is avoided.

XXVIII. STORING CONTROL INFORMATION IN INDEX ENTRIES

The index entries of index 202 are shown as only containing the lobid and pointers. However, the index entries of LOB indexes may contain additional information. According to one embodiment, the first index entry for a particular LOB contains control information, including flags, a length value and a version value. Among other things, the flags may indicate whether the index entry is for a null LOB. The length value indicates the total size of the LOB. The version value indicates the version of the LOB that is pointed to by the index entry.

Because the first index entry for any given LOB stores control information, the first index entry cannot store as many pointers as subsequent index entries for the same LOB. According to one embodiment, the first index entry for a LOB stores up to four pointers while all subsequent index entries for the LOB store eight pointers.

XXIX. IN-TABLE STORAGE OF INDEX INFORMATION

According to one embodiment of the invention, up to a predetermined number (N) of pointers for any given internal LOB are stored in the table cell to which the LOB belongs. The N pointers indicate the location of the first N chunks of LOB data. By storing these pointers in the table, accessing LOB data under common conditions may be performed more efficiently.

Specifically, under normal conditions LOB data is accessed by (1) selecting a row from a table based on criteria specified in a query, (2) reading a lobid from locator stored in the appropriate LOB column within the row, (3) traversing a LOB index built on the LOB column based on the lobid, and (4) following a pointer in the appropriate index entry to the LOB chunk to which access is requested. If N pointers to the first N chunks of a LOB are stored in the table itself, then the server can go straight from reading the row within the table to accessing the LOB data (i.e. step (3) can be avoided) when the portion of the LOB data to be accessed is within the first N chunks of LOB data.

If the portion of the LOB data to be accessed is beyond the first N chunks, then the LOB index must still be traversed. However, many access operations start at the beginning of a LOBs data. For example, the most common operation performed on LOB data that stores a picture would likely be to display the entire picture (rather than just a portion of the picture). Therefore, the most common access request would require the LOB data to be read from the beginning of the LOB data, and the pointer to the first LOB chunk would be one of the N pointers stored in the table itself.

According to one embodiment, LOB data pointer information is stored in a table cell by storing the first index entry for any given internal LOB in the table cell to which the LOB belongs. Storing the first index entry for the LOB in the table may be performed instead of, or in addition to, storing the first index entry in the index itself. As explained above, the first index entry contains up to N pointers to indicate the location of the first N chunks of LOB data, where N is determined by the maximum size of the index entries. The first index entry also includes control information, such as the current version and total size of a LOB. By storing a copy of this information in the table itself, various client inquiries may be handled without having to access the LOB index.

By allowing both LOB data and the first index entry for a LOB to be optionally stored in the table with the locator, various combinations are possible. Specifically, different cells of the same LOB column may contain different combinations of information. For example, the LOB column of one row may contain only a locator, with no index information or LOB data. The LOB column of another row may include a locator and a first index entry, but no LOB data. The LOB column of yet another row may include a locator, the first index entry and the LOB data itself.

Storing LOB data pointer information for a LOB in the table cell to which the LOB belongs increases efficiency in the common case that a LOB is accessed at or near the beginning of the LOB data. In addition, by storing only the first N pointers in the table cell, various problems associated with an approach that stores all pointers in the table cell are avoided. Specifically, if pointers to all LOB chunks of a LOB must be stored in the table cell for the LOB, then the maximum size of LOBs is limited by how many pointers fit within the storage space allocated for table cells. If only four pointers fit with the other information in the table cell of a LOB, then a LOB may have no more than four LOB chunks. On the other hand, no maximum size need be imposed when only the first N pointers are stored in the table cell of the LOB, and any number of additional pointers for the LOB may be stored in any number of index entries within a LOB index.

XXX. SELECTABLE LOB CACHING

When a client requests a read operation to be performed on specified LOB data, the server loads the specified LOB data from slower, non-volatile memory such as a hard disk into faster memory, such as Random Access Memory (RAM). The client is then provided the LOB data from the faster memory. According to one embodiment, a client is able to specify whether or not the LOB data is to be cached in the faster memory.

If a client specifies that the LOB data is to be cached, then the LOB data is loaded from the slower memory into a buffer cache. The copy of the LOB data remains in the buffer cache after the LOB data is provided to the client. Consequently, if the client requests a subsequent operation on the same LOB data, the LOB data will not have to be reloaded from the slower memory.

If a client specifies that the LOB data is not to be cached, the LOB data is provided to the client without storing the LOB data in the buffer cache. Because overhead associated with the buffer cache is avoided, the server is able to deliver the LOB data to the client faster than when the buffer cache is used. In addition, the faster memory used to provide the LOB data to the client may be immediately reused for other purposes. However, if the client requests a subsequent operation on the same LOB data, the LOB data will have to be reloaded from the slower memory.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for accessing large objects (LOBs) that belong to a column of a table, the method comprising the steps of:
    building an index on the column, the index including index entries that contain pointers to blocks containing LOB data associated with the LOBs;
    if a first parameter is set to a first value, then
        storing a locator for each LOB in the table, wherein each locator includes a LOB identifier and a version number for a corresponding LOB; and
        storing LOB data for each LOB out of the table;
    if the first parameter is set to a second value, then
        storing a locator for each LOB in the table; and
        storing LOB data in the table for at least a subset of the LOBs that belong to the column.

2. The method as recited in claim 1, wherein the step of storing LOB data in the table for at least a subset of the LOBs includes the steps of:
    storing the LOB data in the table for LOBs that have LOB data smaller than a specified size threshold; and
    storing the LOB data out of the table for LOBs that have LOB data greater than the specified size threshold.

3. A computer-readable medium carrying one or more sequences of one or more instructions for accessing large objects (LOBs) that belong to a column of a table, the one or more sequences of one or more instructions including instructions which, when executed by one or more processors, cause the one or more processors to perform the steps of:
    building an index on the column, the index including index entries that contain pointers to blocks containing LOB data associated with the LOBs;
    if a first parameter is set to a first value, then
        storing a locator for each LOB in the table, wherein each locator includes a LOB identifier and a version number for a corresponding LOB; and
        storing LOB data for each LOB out of the table;
    if the first parameter is set to a second value, then
        storing a locator for each LOB in the table; and
        storing LOB data in the table for at least a subset of the LOBs that belong to the column.

4. The computer-readable medium as recited in claim 3, wherein the step of storing LOB data in the table for at least a subset of the LOBs includes the steps of:
    storing the LOB data in the table for LOBs that have LOB data smaller than a specified size threshold; and
    storing the LOB data out of the table for LOBs that have LOB data greater than the specified size threshold.

5. A database server configured to manage large objects (LOBs) that belong to a column of a table by:

building an index on the column, the index including
index entries that contain pointers to blocks containing
LOB data associated with the LOBs;
if a first parameter is set to a first value, then
storing a locator for each LOB in the table, wherein each locator includes a LOB identifier and a version number for a corresponding LOB; and
storing LOB data for each LOB out of the table;
if the first parameter is set to a second value, then
storing a locator for each LOB in the table; and
storing LOB data in the table for at least a subset of the LOBs that belong to the column.

6. The database server as recited in claim 5, further configured to store LOB data in the table for at least a subset of the LOBs by:
storing the LOB data in the table for LOBs that have LOB data smaller than a specified size threshold; and
storing the LOB data out of the table for LOBs that have LOB data greater than the specified size threshold.

7. A method for accessing large objects (LOBs) that belong to a column of a table, the method comprising the steps of:
building an index on the column, the index including index entries that contain pointers to blocks containing LOB data associated with the LOBs;
storing a locator for each LOB in the table, wherein each locator includes a LOB identifier and a version number for a corresponding LOB; and
storing within at least one cell in the column a plurality of pointers, where each pointer of the plurality of pointers points to a LOB chunk of a LOB that belongs to the cell.

8. The method as recited in claim 7, wherein:
the plurality of pointers point to a subset of LOB chunks of the LOB; and
the index contains one or more index entries that include pointers to the LOB chunks of the LOB that do not belong to the subset of LOB chunks.

9. The method as recited in claim 8, further comprising the steps of:
receiving a request to access a particular chunk of the LOB;
if the particular chunk belongs to the subset of LOB chunks, then following a pointer in the cell to the particular chunk; and
if the particular chunk does not belong to the subset of LOB chunks, then following a pointer in an index entry of the index to the particular chunk.

10. The method as recited in claim 8, wherein the LOB has a beginning and an end, and wherein the plurality of pointers point to a predetermined number of LOB chunks at the beginning of the LOB.

11. A computer-readable medium carrying one or more sequences of one or more instructions for accessing large objects (LOBs) that belong to a column of a table, the one or more sequences of one or more instructions including instructions which, when executed by one or more processors, cause the one or more processors to perform the steps of:
building an index on the column, the index including index entries that contain pointers to blocks containing LOB data associated with the LOBs;
storing a locator for each LOB in the table, wherein each locator includes a LOB identifier and a version number for a corresponding LOB; and
storing within at least one cell in the column a plurality of pointers, where each pointer of the plurality of pointers points to a LOB chunk of a LOB that belongs to the cell.

12. The computer-readable medium as recited in claim 11, wherein:
the plurality of pointers point to a subset of LOB chunks of the LOB; and
the index contains one or more index entries that include pointers to the LOB chunks of the LOB that do not belong to the subset of LOB chunks.

13. The computer-readable medium as recited in claim 12, further comprising one or more additional instructions which, when executed by the one or more processors, cause the one or more processors to perform the steps of:
receiving a request to access a particular chunk of the LOB;
if the particular chunk belongs to the subset of LOB chunks, then following a pointer in the cell to the particular chunk; and
if the particular chunk does not belong to the subset of LOB chunks, then following a pointer in an index entry of the index to the particular chunk.

14. The computer-readable medium as recited in claim 12, wherein the LOB has a beginning and an end, and wherein the plurality of pointers point to a predetermined number of LOB chunks at the beginning of the LOB.

15. A database server configured to provide access to large objects (LOBs) that belong to a column of a table by:
building an index on the column, the index including index entries that contain pointers to blocks containing LOB data associated with the LOBs;
storing a locator for each LOB in the table, wherein each locator includes a LOB identifier and a version number for a corresponding LOB; and
storing within at least one cell in the column a plurality of pointers, where each pointer of the plurality of pointers points to a LOB chunk of a LOB that belongs to the cell.

16. The database server as recited in claim 15, wherein:
the plurality of pointers point to a subset of LOB chunks of the LOB; and
the index contains one or more index entries that include pointers to the LOB chunks of the LOB that do not belong to the subset of LOB chunks.

17. The database server as recited in claim 16, further configured to:
receive a request to access a particular chunk of the LOB;
if the particular chunk belongs to the subset of LOB chunks, then follow a pointer in the cell to the particular chunk; and
if the particular chunk does not belong to the subset of LOB chunks, then follow a pointer in an index entry of the index to the particular chunk.

18. The database server as recited in claim 16, wherein the LOB has a beginning and an end, and wherein the plurality of pointers point to a predetermined number of LOB chunks at the beginning of the LOB.

* * * * *